US010069713B2

(12) United States Patent
Teter et al.

(10) Patent No.: US 10,069,713 B2
(45) Date of Patent: Sep. 4, 2018

(54) TRACKING DATA LATENCY AND AVAILABILITY FOR DYNAMIC SCHEDULING

(71) Applicant: Raytheon Company, Waltham, MA (US)

(72) Inventors: Marcus A. Teter, Belgrade, MT (US); Brenda S. Dougherty, Denver, CO (US); Steven T. Naumann, Denver, CO (US)

(73) Assignee: Raytheon Company, Waltham, MA (US)

(*) Notice: Subject to any disclaimer, the term of this patent is extended or adjusted under 35 U.S.C. 154(b) by 110 days.

(21) Appl. No.: 15/350,030

(22) Filed: Nov. 12, 2016

(65) Prior Publication Data
US 2017/0142033 A1 May 18, 2017

Related U.S. Application Data

(60) Provisional application No. 62/254,903, filed on Nov. 13, 2015.

(51) Int. Cl.
| | |
|---|---|
| *H04L 12/26* | (2006.01) |
| *H04L 12/869* | (2013.01) |
| *H04L 12/841* | (2013.01) |
| *H04L 29/06* | (2006.01) |

(52) U.S. Cl.
CPC .......... *H04L 43/16* (2013.01); *H04L 43/0805* (2013.01); *H04L 43/087* (2013.01); *H04L 47/283* (2013.01); *H04L 47/60* (2013.01); *H04L 69/28* (2013.01); *H04Q 2209/60* (2013.01)

(58) Field of Classification Search
None
See application file for complete search history.

(56) References Cited

U.S. PATENT DOCUMENTS

| | | | | |
|---|---|---|---|---|
| 2007/0058544 | A1* | 3/2007 | Kim | H04L 47/14 370/230 |
| 2008/0114638 | A1* | 5/2008 | Colliau | G06Q 10/06314 705/7.19 |
| 2008/0320219 | A1* | 12/2008 | Okada | G06F 11/2074 711/114 |
| 2016/0128056 | A1* | 5/2016 | Jiang | H04L 27/2602 370/329 |
| 2016/0306824 | A1* | 10/2016 | Lopez | G06T 3/4092 |

* cited by examiner

*Primary Examiner* — Diane Lo
(74) *Attorney, Agent, or Firm* — Schwegman Lundberg & Woessner, P.A.

(57) ABSTRACT

Generally discussed herein are devices, systems, and methods for determining if a master schedule will allow information to be recorded and downloaded from a node. A method can include receiving a plurality of schedules including a first schedule, a second schedule, and a list, determining, at the scheduler circuitry and based on the first schedule and the list, whether there is a threshold latency between mission data collection and downlink, determining, at the scheduler circuitry and based on the first schedule, the second schedule, and the list, whether any mission data will be overwritten in performing operations of the master schedule, and providing, by a display communicatively coupled to the scheduler circuitry, a first warning in response to determining that there is a threshold latency between mission data collection and downlink and a second warning in response to determining that mission data will be overwritten.

20 Claims, 13 Drawing Sheets

TRACKING DATA LATENCY AND AVAILABILITY FOR DYNAMIC SCHEDULING

REFERENCE TO RELATED APPLICATION

This application claims the benefit of priority to provisional patent application No. 62/254,903, filed on Nov. 13, 2015, which is incorporated by reference herein in its entirety.

GOVERNMENT RIGHTS

This invention was made with United States Government support under Contract Number NNG10XA03C. The United States Government has certain rights in this invention.

TECHNICAL FIELD

One or more embodiments relate to determining if a schedule has a potential to lose data or includes another conflict.

TECHNICAL BACKGROUND

Scheduling data collection and/or processing can be important in helping to ensure that no data is lost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
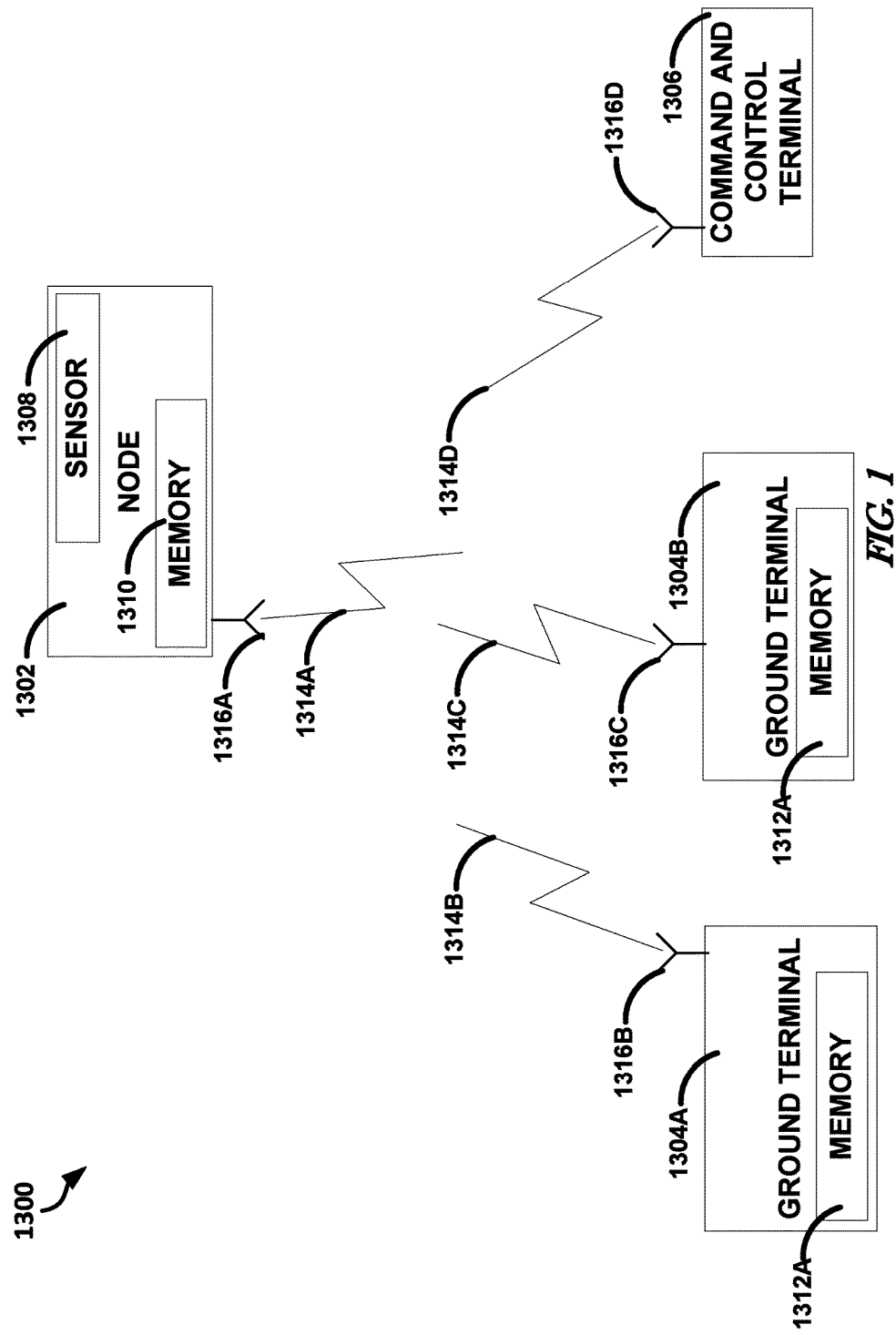
FIG. 1 illustrates, by way of example, a logical block diagram of an embodiment of a system for tracking data latency and availability.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

To meet data latency requirements, data (SMD data or data collected by a weather satellite) can be collected, downlinked, backhauled, and processed within a certain time frame, such as on a weather satellite. This requires coordination of the downlinks, such as to ensure that the time from collection to completion of processing is met. In a dynamic scheduling environment, resources necessary to complete one or more processes (e.g., collection, downlink, backhaul, processing, or the like) can be unavailable, such as during off-nominal situations. This unavailability of resources can lead to changes in a schedule that will meet or fail latency. In the case of data missing latency, that data becomes a secondary consideration to downlink at some later time, such as to help ensure future data availability. The scheduling efforts to keep track of the variables in the off-nominal situation are challenging and labor intensive, making them difficult to implement (quickly) when off-nominal situations occur. This can lead to loss of valuable data, such as in addition to failing to meet data latency requirements.

The problem of tracking the data recorder can be a focus of mission concept of operations (conops) planning, such as to help ensure that the mission plan is consistent with moving the data off of the recorder to meet latency. Some data recording tracking focuses mainly a systems level analysis activity and works primarily for nominal mission operations situations and does not work for off-nominal operations situations.

One or more embodiments provide a scheduling scheme that can help determine whether gathered data will provide a conflict to data retention, processing, backhaul, downlink, or the like. In one or more embodiments, the scheduling scheme creates a means of determining the status and location of (all) the data on a recorder at any time during the schedule, revealing potential problems with the existing schedule. The scheme can use the schedule itself as a predictive measure of the data collected, and the timeline when such data needs to be off-loaded to meet latency and availability. The timing and mode of data collections can help indicate an amount of data generated, and predict the lifetime of the data. The downlink events allow predictive logic to determine if data will meet scheduling requirements.

In one or more embodiments, the scheme uses the predicted use of the recorder from the schedule to determine if data would meet latency due to downlink (DL) schedule, or if any data would be lost due to lack of DL scheduling. Such embodiments can be used for providing an automated scheduling tool.

FIG. 1 illustrates, by way of example, a logical block diagram of an embodiment of a system 1300 for tracking data latency and perishability. The system 1300 as illustrated includes a node 1302 (or a plurality of nodes), one or more ground terminals 1304A and 1304B, and a command and control terminal 1306. The nodes 1302, in one or more embodiments, can include a satellite, an aerial vehicle, such as an unmanned aerial vehicle, a water vehicle, a land vehicle, or the like.

The node 1302 includes a memory 1310 and one or more sensors 1308. The memory 1310 has a limited storage space, such as a solid state recorder (SSR) memory. The memory 1310 can be populated by data from the sensors 1308. The spaces of the memory 1310 can be filled by the data from the sensors 1308, such as sequentially. If the sensor data reaches an end of the memory space, the data from the sensors 1308 can be written over data at another end of the memory space and continue in the sequential manner. The sensors 1308 can create science mission data (SMD) or other data. In one or more embodiments, the sensors 1308 can include one or more of a humidity sensor, pressure sensor, oxygen sensor, radar, LIDAR, Doppler, conductivity, resistivity, barometer, wind speed, temperature, or other sensor.

The data from the memory 1310 can be downloaded (e.g., downlinked) to one or more ground terminals 1304A-B. The link to the ground terminals 1304A-B, represented by links 1314A, 1314B, and 1314C, can be available only at specific times, such as can be based on a position of the node 1302 relative to the ground terminal 1304A-B. The node 1302 can be in motion relative to the ground terminal 1304A-B, which can affect a signal strength associated with the link 1314A-D. The downlink/download can thus be delayed relative to collection of data from the sensors 1308. The data on the memory 1310 is thus not guaranteed to be downloaded before the data is overwritten by new data. A warning can be created, such as by circuitry of the command and control terminal 1306 that indicates whether data of the memory 1310 is in jeopardy of not being downloaded to one or more of the ground terminals 1304A-B, among other warnings.

The ground terminals 1304A-B include one or more memories 1312A-B on which data from the node 1302 can be downloaded. Each of the node 1302, ground terminal 1304A-B, and command and control terminal 3106 can include communication circuitry 1316A, 1316B, 1316C, and/or 1316D. The communication circuitry 1316A-D can include an antenna, an antenna array, a radio transmitter, a radio receiver, an amplifier, a modulator, a demodulator, an analog to digital converter (ADC), a digital to analog converter (DAC), or the like. The communication circuitry 1316A-D can provide or receive electromagnetic signals to or from other communication circuitry 1316A-D. The communication circuitry 1316A-D can convert the received signals to data that can be stored in one or more of the memories 1310 and/or 1312A-B.

Figure 2:
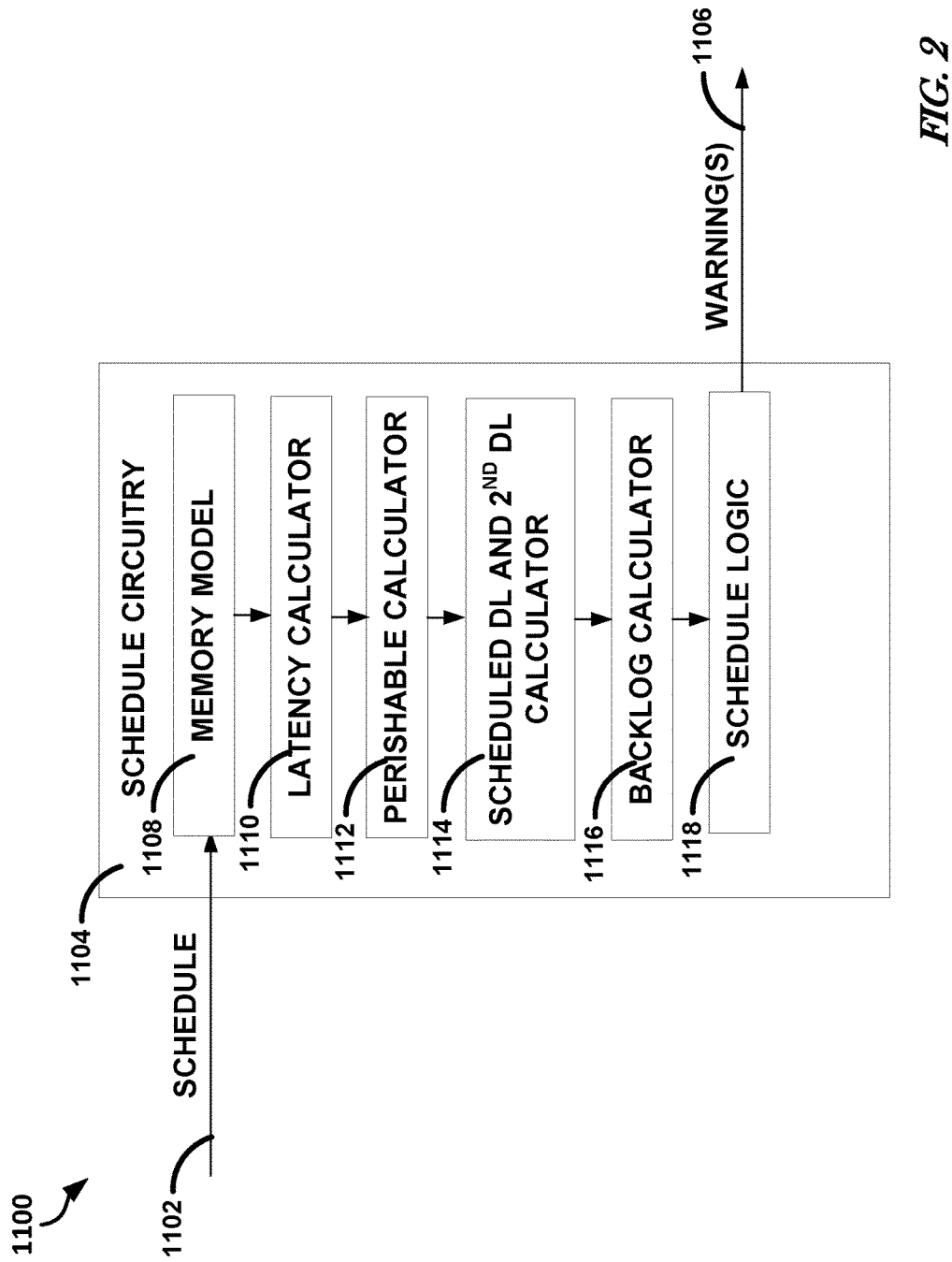
FIG. 2 illustrates, by way of example, a logical block diagram of schedule circuitry, such as can be used for tracking data latency and availability.

FIG. 2 illustrates, by way of example, a logical block diagram of an embodiment of a device 1100 for determining whether a data collection and/or processing schedule 1102 includes a conflict. The device 1100 can include schedule circuitry 1104 that receives a schedule 1102 as input and produces one or more warnings 1106 as an output. The warnings 1106 can indicate potential conflicts in the schedule 1102. The device 1100 can be a part of the command and control terminal 1306.

The device 1100 can be a part of schedule validation. The device 1100 can detect potential conflicts in the schedule 1102, such as potential conflicts related to download scheduling (e.g., science mission data (SMD) download scheduling). In response to a schedule being built, the device 1100 can help validate that the schedule has adequate download provisions to help ensure acceptable loss of data (e.g., less than a specified threshold data loss), maintain data latency (e.g., include data latency less than a threshold maximum or average) or otherwise indicate one or more potential problems in the schedule. Should the download schedule be inadequate, the device 1100 can provide a time window and a type of failure that has occurred, such as can be indicated in the warning(s) 1106. Corrective action, in response to an error, can be performed by a user and/or automatically, such as by the schedule circuitry 1104. An update can be provided (e.g., in real time) by a DL, such as can give a real time update to the validation process, such as to enable real time warning. In one or more embodiments, recommended fixes can be used such as to enable for automatic fixes and/or to use results for auto-scheduling.

The device 1100 includes the schedule circuitry 1104 that includes circuitry to implement sub-schemes for the schedule validation. The schedule circuitry 1104 can include circuitry, such as memory model circuitry 1108, latency calculator circuitry 1110, perishable calculator circuitry 1112, scheduled DL and scheduled $2^{nd}$ downlinked (SD2D) calculator circuitry 1114, backlog calculator circuitry 1116, and schedule logic circuitry 1118. Each of the elements of the schedule circuitry 1104 may be implemented as circuitry, in one or more embodiments, such as can be included in one or more modules, such circuitry and modules are discussed elsewhere herein.

The schedule circuitry 1104 can use the start and end times of an already scheduled DL window for processing. At the start of the DL window, the following circuitry can perform their respective operations: memory model circuitry 1108, latency calculator circuitry 1110, perishable calculator circuitry 1112, SD2D calculator circuitry 1114, backlog calculator circuitry 1116, and schedule logic circuitry 1118.

The schedule logic circuitry 1118 returns a list of warnings. In one or more embodiments, these warnings can be used (e.g., by a display) to generate visual clues to an operator that there exists a problem with the schedule during the period in question. In one or more embodiments, actions to be taken are up to the operator to act on the warnings. The warnings can act as a verification that the schedule has failed to meet some aspect of the scheduled operations. In one or more operations, the warnings 1106 can be used to automatically adjust the schedule, such as by the schedule circuitry 1104.

The schedule logic circuitry 1118 generates a mapping of different warnings based on input from one or more other components (e.g., one or more of memory model circuitry 1108, latency calculator circuitry 1110, perishable calculator circuitry 1112, SD2D calculator circuitry 1114, backlog calculator circuitry 1116, and schedule logic circuitry 1118). These warnings can be used to help determine the quality of a schedule and/or serve as a verification process. The inputs to the schedule logic circuitry 1118 can include a perishable list, a latency list, a scheduled list, a downlinked list, a second scheduled list, and/or a second downlinked list. Each of the inputs can include an indication of a start position, a stop position, and/or a perishable class.

The perishable list can include a list of start and stop positions on the solid state recorder (memory) and the class of the perishable data. The positions can be of type integer and/or have dimensions of bytes. Each list element can include a range of data on the memory where the data in the region may be lost if not downlinked. The perishable class is a designation that the data could be lost if certain conditions are not met. The perishable list is calculated by the perishable calculator circuitry 1112 that is discussed later.

The latency list can include a list of start and stop positions on the memory. The positions can be of type integer and have dimensions of bytes. Each list element can include a range of data on the memory where the data in the region will meet latency by the time of interest. The latency list is the output of the latency calculator circuitry 1110 that is discussed later.

The scheduled list can include a list of start and stop positions on the memory. The positions can be of type integer and have dimensions of bytes. Each list element can include a range of data on the memory where the data in the region has been scheduled for downlink by the time of interest.

The downlinked list can include a list of start and stop positions on the memory. The positions can be of type integer and have dimensions of bytes. Each list element can include a range of data on the memory where the data in the region has been downlinked by the time of interest.

The second scheduled list can include a list of start and stop positions on the memory. The positions can be of type integer and have dimensions of bytes. Each list element can include a range of data on the memory where the data in the region has been scheduled for a second downlink by the time of interest.

The second downlinked list can include a list of start and stop positions on the memory. The positions can be of type integer and have dimensions of bytes. Each list element can include a range of data on the memory where the data in the region has been downlink a second time by the time of interest. The scheduled, downlinked, second scheduled, and second downlinked lists are generated by the SD2D calculator circuitry 1114 that is discussed later.

The output from the schedule logic circuitry 1118 can include a warning 1106. The warning 1106 can include the start time and stop time. The times can include time types that can be measured in seconds or other time measurement. The warning 1106 can include a warning type. The warning type can be indicated by string type variable and can relate to the nature of the warning. The types of warnings can include a class 0 availability warning, class 1 availability warning, class 2 availability warning, class 3 availability warning, latency warning, backlog warning, and/or second downlink warning.

The operations of schedule logic circuitry 1118 can be performed at the beginning and/or the end of each scheduled DL window from a common contact schedule (CCS). The time of interest can be either the start time or the stop time of the DL window. The existing schedules can be used to generate the memory mapping and that mapping can be used to determine various states. After the lists have been generated and passed to the schedule logic circuitry 1118, the schedule logic circuitry 1118 can generate the warnings 1106 based on the lists.

The class 0 availability warning can be generated using the CCS, perishable list, the scheduled list, and/or the downlinked list. The class 0 availability warnings can be generated using a time of interest as a start time, and a beginning of a next DL window from the CCS as a stop time. The class 0 availability warning can occur if there is a class 0 entry on the perishable list, and the data has been neither scheduled nor downlinked. If the entry on the perishable list has been scheduled or downloaded, then there is no warning. Class 0 warnings generally do not occur if the time of interest is at or near the start of a DL. If the class 0 warning occurs after a DL, then other warnings should have been seen in previous DLs that warned of the error.

The class 1 availability warning can be generated using the CCS, perishable list, the scheduled list, and/or the downlinked list. The class 1 availability warning can be generated using the time of interest as a start time, and the end of the next downlink window from the CCS as a stop time. The class 1 availability warning occurs if there is a class 1 entry on the perishable list and the data has been neither scheduled nor downlinked. If the entry on the perishable list has been scheduled or downloaded, then there is no warning. A class 1 error occurs at the time of interest, such as at the start of a DL. Because the data to be collected during the DL will overwrite the data on the memory, class 1 data has not been scheduled to DL at the beginning of the downlink. The class 1 availability warning allows the operator to reschedule one or more items of a next PPS for the DL.

The class 2 availability warning can be generated using the CCS, perishable list, the scheduled list, and/or the downlinked list. The class 2 availability warnings can be generated using the time of interest as the start time, and the end of the next downlink window from the CCS as the stop time. The class 2 availability warning occurs if there is a class 2 entry on the perishable list, and the data has been neither scheduled nor downlinked. If the entry on the perishable list has been scheduled or downloaded, then there is no warning. A class 2 error occurs at the time of interest, such as at the start of a DL. This data would be overwritten during the period of time after the next DL and/or the following DL. The warning allows the operator to reschedule the next PPS for the DL.

The class 3 availability warning can be generated using the CCS, perishable list, the scheduled list, and/or the downlinked list. The class 3 availability warnings can be generated using the time of interest as the start time, and the end of the next DL window from the CCS as the stop time. The class 3 availability warning occurs if there is a class 3 entry on the perishable list, and the data has been neither scheduled nor downlinked. If the entry on the perishable list has been scheduled or downloaded, then there is no warning. A class 3 availability warning can be to prevent another class 1 availability warning at the beginning of the subsequent DL.

Generally, the class "x" warnings increase in severity as the number x increases. Class 0 warnings generally do not need to be acted on immediately, or even in the near future, whereas class 3 warnings indicate that data will be lost or is lost if no action is taken in the near future.

The latency warning can be generated using the CCS, latency list, the scheduled list, and/or the downlinked list. The start time of the latency warning is the time of interest, and the stop time of the latency warning is the end time of the next DL on the CCS. A latency warning can be generated for the windows on the latency list that have neither a scheduled nor a downlinked entry. If there is no window on the latency list that is missing either a scheduled or a downlinked entry, then there is no latency warning.

The backlog warning can be generated using the CCS and/or the backlog list. The start time of the backlog warning is the time of interest and the end time of the backlog is the end time for the next DL on the CCS. The backlog warning is generated if there are any windows on the backlog list.

The second downlink warning can be generated using the CCS, the second scheduled list, the second downlinked list, the scheduled list, and/or the downlinked list. The start time of the second downlink warning is the time of interest, and the end time of the second downlink warning is the end time for the next DL on the CCS. The second downlink warning occurs when the windows of the combined scheduled and downlinked do not have corresponding second scheduled or second downlinked entries. If all scheduled and downlinked lists have corresponding second scheduled and second downlinked entries, then there is no second downlink warning In one or more embodiments, the schedule logic circuitry 1118 can makes the following assumptions: the memory model circuitry 1108, perishable calculator circuitry 1112, latency calculator circuitry 1110, the SD2D calculator circuitry 1114, and the backlog calculator circuitry 1116 have all provided inputs for the time of interest and the time of interest is at or near the start or the end of an existing DL window.

Memory Model Circuitry

Figure 5:
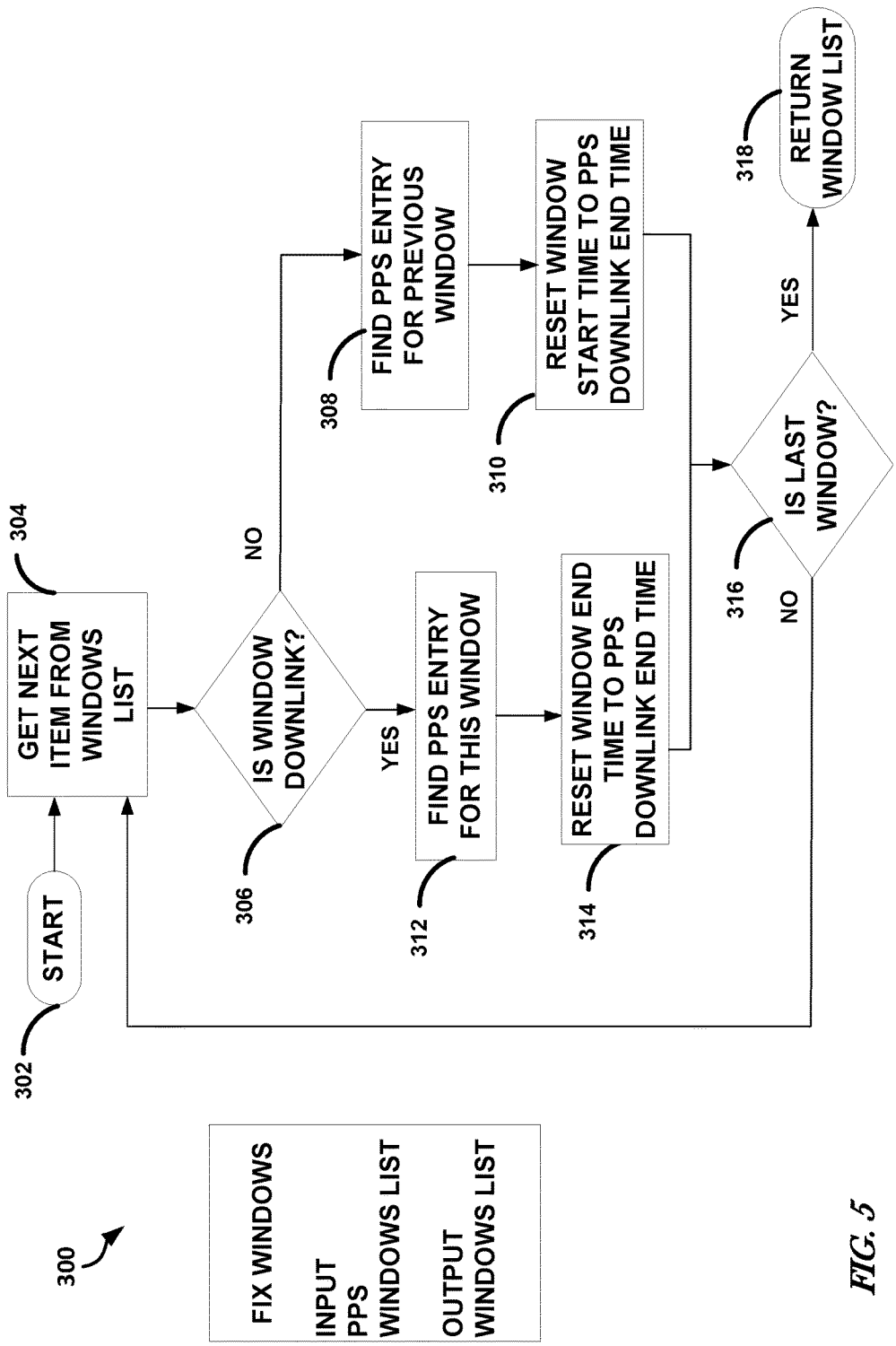
FIG. 5 illustrates, by way of example, a flow diagram of an embodiment of yet other operations that can be performed by memory model circuitry.
Figure 6:
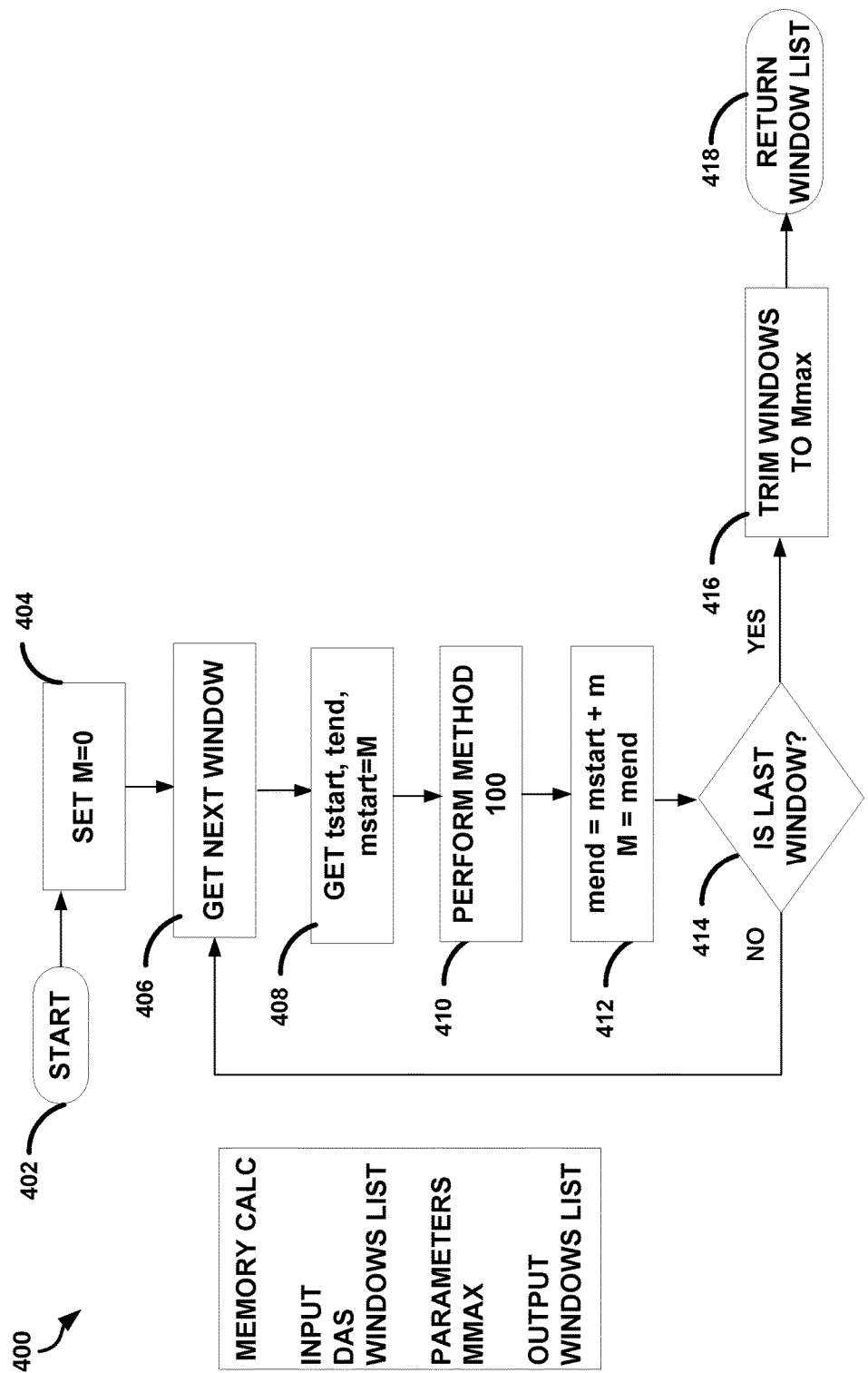
FIG. 6 illustrates, by way of example, a flow diagram of an embodiment of yet other operations that can be performed by memory model circuitry.

The memory model circuitry 1108 can implement methods 100 (FIG. 3), 200 (FIG. 4), 300 (FIG. 5), and 400 (FIG. 6). The memory model circuitry 1108 provides an updated model intended to assign parameters for activities. The memory model circuitry 1108 converts time windows to data windows on the memory. The detailed activity schedule (DAS), CCS, pass plan schedule (PPS), time of interest, start time, and stop time are taken as inputs to the memory model circuitry 1108, such as can be provided by the schedule 1102. The DAS, CCS, and PPS help enable the creation of the data windows. After the data windows have been identified, the memory model enables various parameters to be set based upon status of data on the memory.

The DAS is the detailed activity schedule (DAS) that is a subset of a master schedule, such as the schedule 1102. In one or more embodiments, the DAS has three entries of interest, the start time, the stop time, and the activity type for each start time and stop time. The DAS can have entries for one or more activities (e.g., every activity) associated with the mission.

The CCS is the common contact schedule (CCS) that is a subset of the master schedule. In one or more embodiments, the CCS has three entries of interest, the start time, the stop time, and the activity type. The CCS has one or more entries for contacts (e.g., downlinks) that have been scheduled by the mission, such as can include one or more entries for each of the contacts that have been scheduled by the mission. In one or more embodiments, the CCS has two types of contact: a ground contact and a tracking data relay satellite system (TDRSS) contact. For each CCS entry there may be a corresponding set of entries on the PPS.

The PPS is the pass plan schedule (PPS) that is a subset of the master schedule. In one or more embodiments, the PPS has three entries of interest, the start time, the stop time, and the activity type. In one or more embodiments, the PPS has a set of entries for one or more of the contact windows (e.g., downlink windows) that have been scheduled by the mission, such as can include a set of entries for each of the contact windows that have been scheduled by the mission. The PPS can include a number of activities corresponding to the means of downlinking data to the ground. The types of these activities are used, such as if the activity corresponds to downlinking data, then the start and stop times associated with the collection of the data is reported. The time of interest is the time in which the calculation is being performed. Nominally, the algorithm will be calculated for the time of the start of a downlink, and the time of the end of the downlink. The start time is the time to start the memory calculation. The stop time is the time to stop the memory model calculation. The start and stop time parameters allow for a time constraint on the period to calculate the memory model, such as by using the memory model circuitry 1108.

A memory list can be output from the memory model circuitry. Each entry in the memory list can include a start time and a stop time, a start position and a stop position, a rate of data write, and an identification (ID). The memory list can be used to understand the mapping of the data on the memory. The start time and stop time relate to the collection time window associated with the data on the memory. The start position and stop position relate to the position on the memory containing the data. The rate is the average rate of collection during the window. The ID is the identifier of the position.

The memory model circuitry 1108 can perform a series of operations that determine a mapping of the memory that corresponds to a position on the memory. Each of the input schedules can be used to define the mapping and the times of events. To generate the memory model, the CCS, PPS, and DAS can be used by the memory model circuitry 1108, such as in conjunction with a memory model (e.g., a memory list detailing contents of the memory) from the memory model circuitry 1108.

Figure 3:
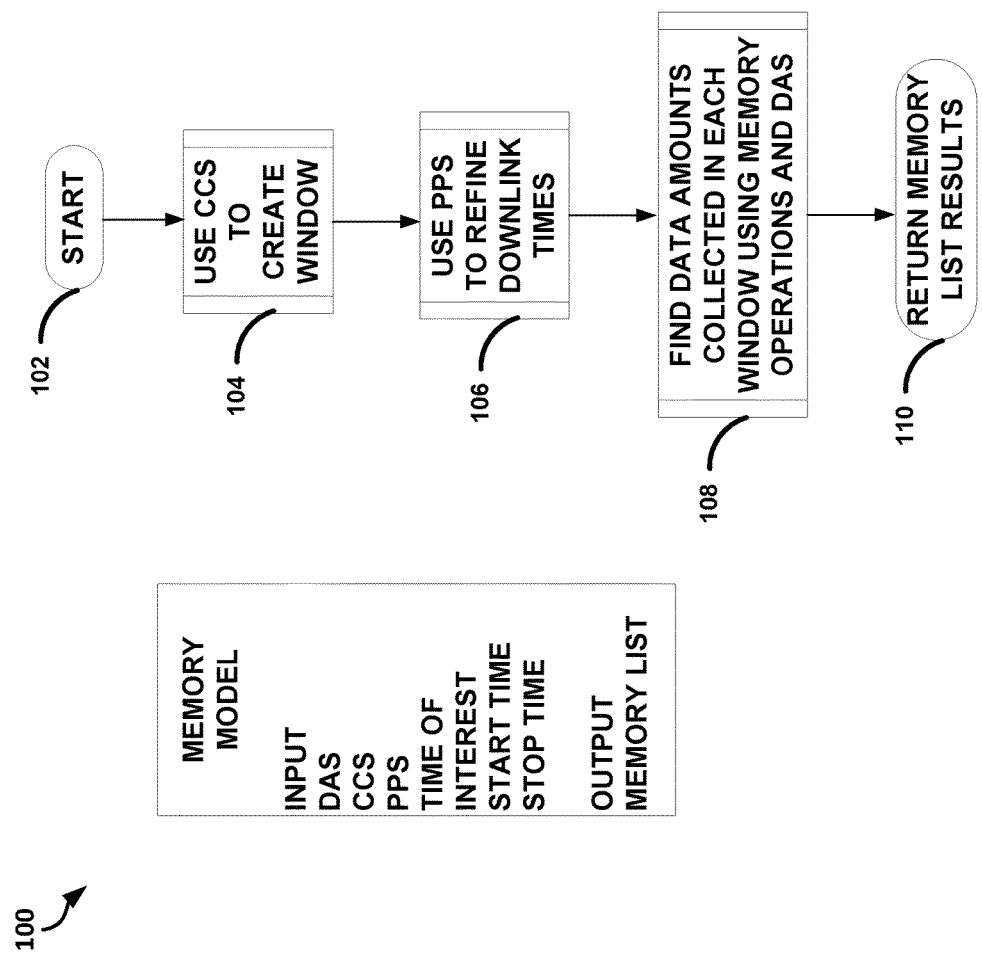
FIG. 3 illustrates, by way of example, a flow diagram of an embodiment of operations that can be performed by memory model circuitry.

FIG. 3 illustrates, by way of example, an embodiment of a flow diagram of a method 100 detailing operations that can be performed by the memory model circuitry 1108. At operation 102, the method 100 starts. At operation 104, CCS entries are used to create windows for the memory list results. The process of the window creation is discussed in more detail below. The windows can correspond to the DL activities on the CCS and the corresponding regions occurring between DL activities. Since the last moment of DL does not always occur at loss of signal (LOS), the start and end times of the memory activity windows may not correspond to those windows based on the CCS, those times can be refined, such as at operation 106. More details regarding the operation 106 are discussed below.

At operation 108, and in response to the operation 106, the actual data associated with the memory model can be calculated. More details regarding the process of the memory model calculation is discussed below, such as with regard to the memory calc function (FIG. 6). At operation 110, in response to the operation 108, the resulting memory list is returned. The format of the memory list can be determined by the output formatting discussed earlier. Note that the memory is a specific memory, and memory can be replaced with memory.

Figure 4:
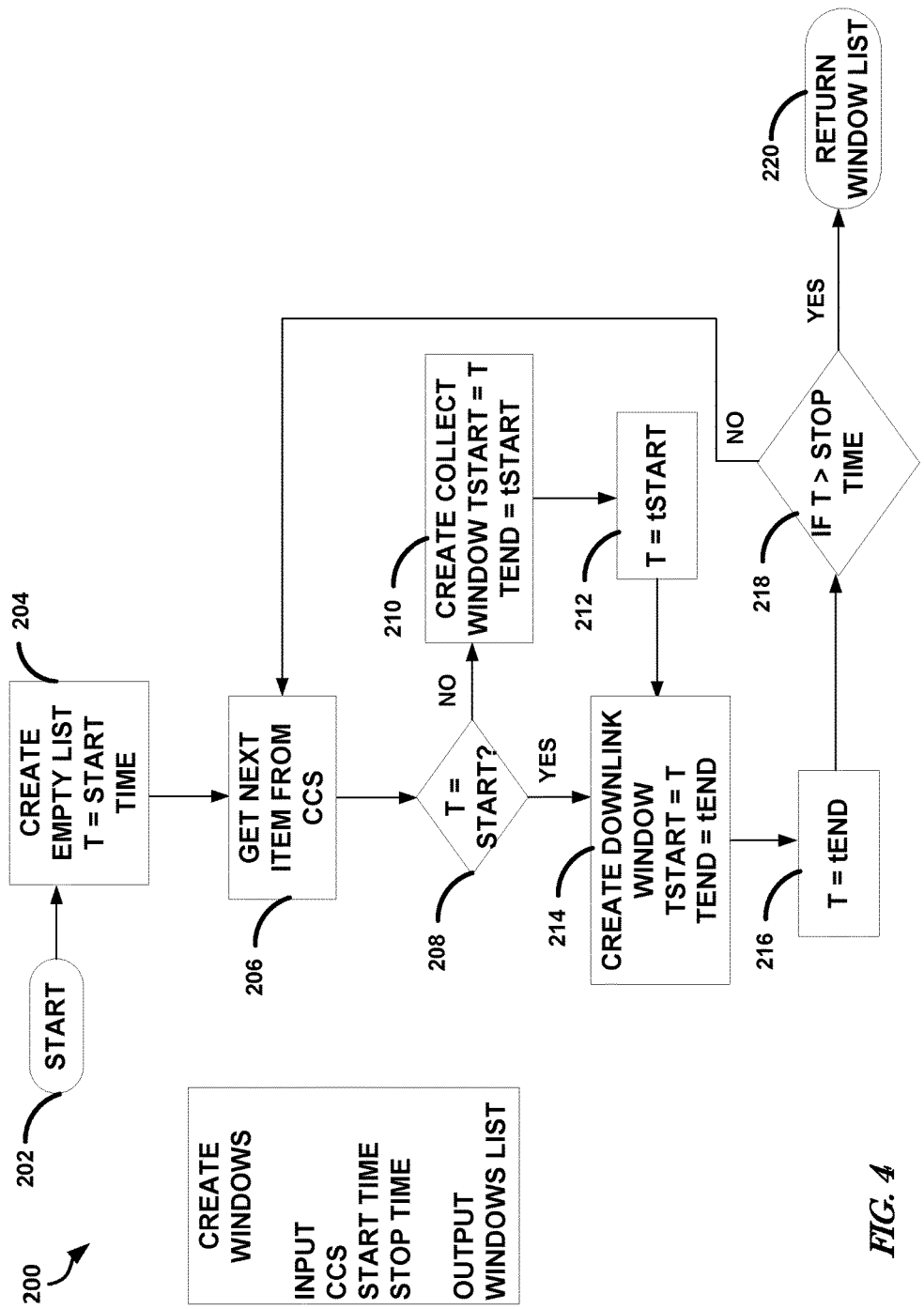
FIG. 4 illustrates, by way of example, a flow diagram of an embodiment of other operations that can be performed by memory model circuitry.

FIG. 4 illustrates, by way of example, a flow diagram of a method 200 including operations for creating windows. The method 200 can be a method of performing the operation 104. The method 200 as illustrated includes starting, at operation 202; creating an empty list and setting T=start time, at operation 204; getting a next item from the CCS, at operation 206; determining if T=start time, at operation 208; creating a collect window with Tstart=T and Tend=Tstart, at operation 210, such as if T does not equal start time; setting T=Tstart, at operation 212, such as in response to performing the operation 210; creating a downlink window, at operation 214, such as by setting Tstart=T and Tend=Tend; setting T=Tend at operation 216; determining if T is greater than the stop time at operation 218; if T is not greater than the stop time, performing operations from the method 200 beginning at operation 206; if T is greater than the stop time then returning the window list at operation 220.

The input for the operation 104 (e.g., the method 200) can include the CCS, the start time, and stop time. The start and stop time define the time window for memory model creation. The CCS gives the DL window times. The output for the create windows function includes a list of time windows.

The process for create windows, as previously discussed, begins by creating an empty list and setting the internal process variable T to the start time, at operation 204. The empty list is to be the beginning of the time list of collection windows and DL windows. Note that the DL windows also have a collection component to them. The internal process variable T allows the memory model creation to be completed for a specific time window, rather than the CCS time frame. For example, the first entry on the CCS may be time t1, but the memory model may start at an earlier time t0. The variable T provides the ability for the memory model to start at the t0 time, rather than the first time listed in the CCS.

Next the method 200 loops over all of the entries in the CCS, at operation 206. Each item from the CCS will have start and stop times, denoted tstart and tend. The loop will terminate once the internal process variable T reaches or exceeds the input stop time. If the internal variable T does equal tstart, then operations 210 and 212 are skipped. A window of type "collect" can be created with the start time Tstart being set to T and the end time Tend being set to tstart at operation 210, such as if T does not equal the start time. Then, internal variable T is set to tstart, at operation 212.

A window of type "downlink" can be created with the start time Tstart being set to T and the end time Tend being set to Tend at operation 214. Then, the internal variable T is set to tend at operation 216. Finally, after completing the looping over the entries in the CCS, the output windows list will be returned at operation 220. The windows list may have no gaps in time, covering the range from start time to end time.

FIG. 5 illustrates, by way of example, a flow diagram of a method 300 for implementing the operation(s) 106. The method 300 (e.g., the fix windows operation(s) 106), as illustrated, can help ensure that the end of a DL window (and the subsequent collect window) corresponds to the end of downlink rather than a loss of signal (LOS). The details in the PPS allow for correcting the times. Each time the pass plan changes, it is likely that the end of DL may change and that can be fixed by performing the operation(s) of the method 300.

The method 300 as illustrated includes starting, at operation 302; retrieving a next item from the windows list, at operation 304; determining whether the item is a DL window, at operation 306; if the item is not a DL window, then finding a PPS entry for a window prior to the retrieved item, at operation 308; setting a window start time to PPS DL end time of the previous window (from operation 308), at operation 310; if the window is a DL window, then finding a PPS entry for the DL window, at operation 312; setting a wind end time for the retrieved window to PPS DL end time for the corresponding PPS entry (from operation 312), at operation 314; determining whether the window retrieved at operation 304 is the last window, at operation 316; if it is not the last window, the method 300 continues at operation 304; and if it is the last window, the windows list is returned (in modified form), at operation 318.

The input for the fix windows operation can include the PPS and a windows list, such as from the operation(s) 104 (e.g., the method 200), such as can include the unmodified start time and stop time. The PPS gives the information necessary to correct the start and stop times. The output from the method 300 can be a modified windows list that has been modified from the input, such as to correct one or more time windows thereof. The method 300 begins at operation 302. The operation at 304 includes getting the next item from the windows list. The operations of the method 300 modify the start and stop times for the window. The method 300 can continue until all windows have been processed.

If the window is determined to be a DL window at operation 306, the PPS entry corresponding to the DL window can be found at operation 312. Typically, in the PPS, the last DL occurs for the data collected since the beginning of the DL window. The end of the last DL can be reset to be the end time for the window of the PPS entry, at operation 314. Otherwise, the PPS entry for the window immediately preceding the collection window is found at operation 308. Typically, in the PPS, the last DL occurs for the data collected during the last DL window. The end time of the last DL can be set as the start time for the collection window at operation 310. At operation 316, it is determined if the current window is a last window to be processed. Finally, after completing the looping over the entries in the windows list, the modified output windows list will be returned at operation 318. The windows list may have no gaps in time.

FIG. 6 illustrates, by way of example, a flow diagram of a method 400 for implementing the operation(s) 108. The memory calc function (the operations in the method 400) helps to convert the times in the windows list into the positions on the memory. The method 400 can also help complete the entries on the memory list. The processing relies on the memory model that is from the memory model circuitry 1108. The memory calc function includes the DAS and the window list as inputs. In one or more embodiments, the memory calc function includes a parameter Mmax that corresponds to the maximum size of the memory.

The memory calc function starts at operation 402. The memory calc function receives input in the form of the DAS and the windows list that had been previously run through the fix function (e.g., the method 300). The DAS provides information to indicate the positions on the memory and the rates of writing. The windows list provides time windows for the calculation and serves as the output. The method 400 includes (creating the internal parameter M and) setting M to zero at operation 404. The method 400 continues by getting the next window from the windows list, at operation 406. The method 400 can continue until the last window has been processed. Each window has a start time tstart and an end time tend. The parameter mstart is set to the value of M, and tstart and tend are retrieved, at operation 408. The memory model from memory model circuitry 1108 is called at operation 408. The memory model takes the DAS, tstart, and tend as input. The memory model returns the number of bytes recorded by the memory during the duration between tstart and tend. The returned number becomes the parameter m. The parameter mend is calculated by adding the parameter in to mstart, at operation 412. The parameter M is set to the value of mend. At operation 414, it is determined if the last window processed is the last window to be processed. If so, the method 400 continues at operation 414. If not, the process continues at operation 406. At operation 416, the windows are trimmed to Mmax. Finally, after completing the looping over the entries in the windows list, the modified output windows list will be returned at operation 418. The windows list may have no gaps in time, and no gaps in position.

Latency Calculator Circuitry

The latency calculator circuitry 1110 can determine data latency, such as can be based on memory device motion characteristics, such as can be based on orbital mechanics and/or DL time. Note that there can be additional parameters, such as the processing time that go into the DL calculation. The latency calculator circuitry 1110 can take DAS, memory list, and time of interest as inputs and produce a latency list. The latency calculator circuitry 1110 can also consider one or more parameters, such as a backhaul rate, a DL rate, a production rate, and a latency time window in producing the latency list.

The memory list is the output from the memory model circuitry 1108, such as is previously discussed. The time of interest is the time for which the calculation is being performed. Nominally, the latency can be calculated for the time of the start of a DL, and the time of the end of the DL. The parameter(s) can include zero or more of a backhaul rate (the rate of backhaul from ground terminal X), a DL rate (a DL rate to ground terminal X), a production rate (a product production rate), and/or a latency time window (time required to meet latency).

The latency list, produced by the latency calculator circuitry 1110 can include a list of start and stop positions on the memory. The positions can be considered type integer and have dimensions of bytes. Each list element can include a range of data on the memory where the data in the region will meet latency by the time of interest.

The latency calculator circuitry 1110 takes the latency time and maps it on the memory based upon when the data had been collected. Since the newest data on the memory is at the beginning, the latency window measures the data from the beginning of the memory (note other discussion herein regarding translation of the memory model to the actual position on the rolling memory). The memory provides a coarse measurement of the time. The DAS provides the detailed measurement of time. The parameters allow the measurement of the times associated with each activity.

Figure 7:
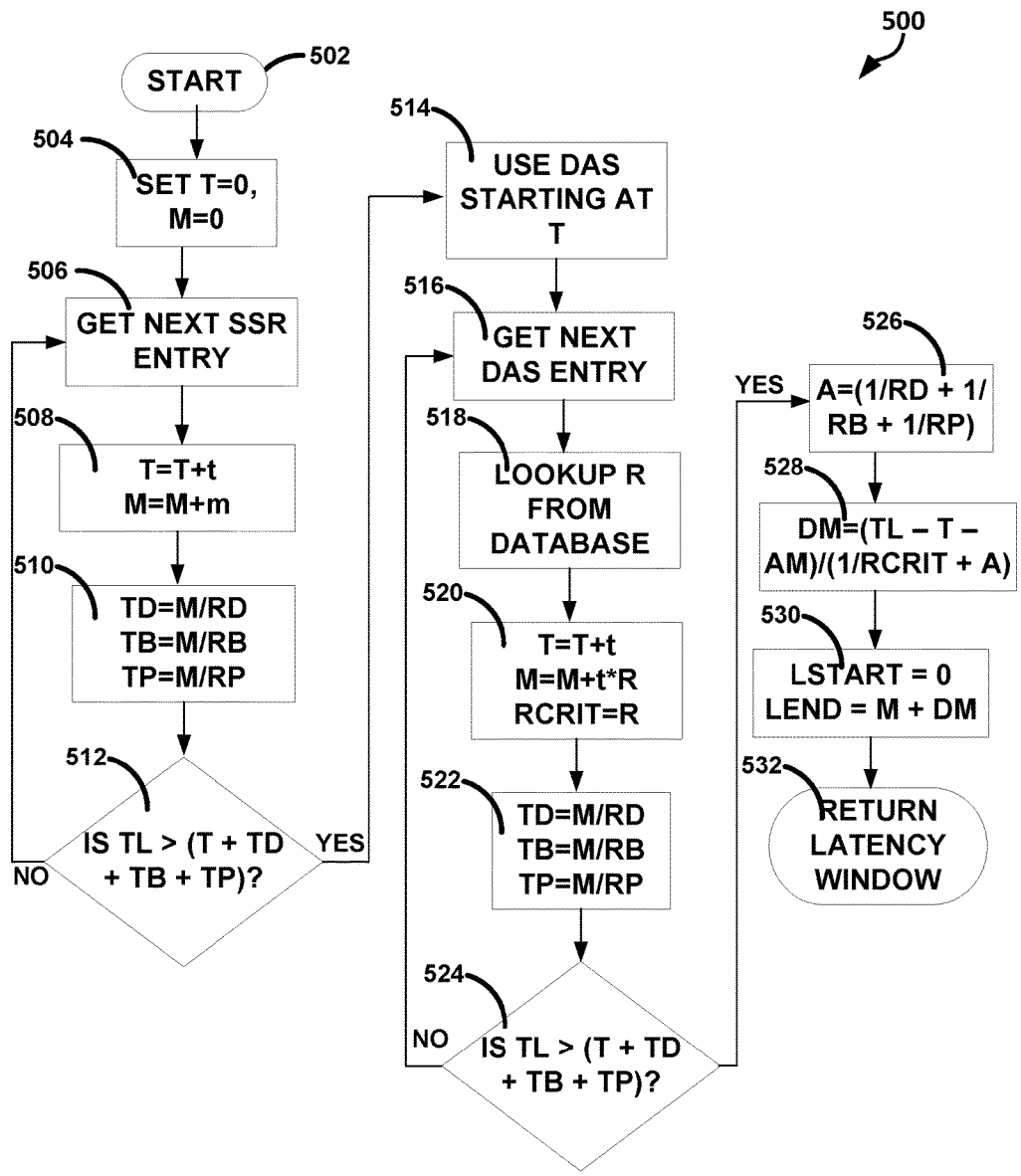
FIG. 7 illustrates, by way of example, a flow diagram of an embodiment of operations that can be performed by latency calculator circuitry.

FIG. 7 illustrates, by way of example, a flow diagram of an embodiment of a method 500 for performing operations of the latency calculator circuitry 1110. The method 500 begins at operation 502. The method 500 can include reading in the input parameters. The memory list provides the time information for a coarse measurement. The DAS provides the time and rate information for a detailed measurement.

The method 500 can include setting the internal processing parameters M and T to zero at operation 504. The internal processing parameter M is a memory position, can be of type integer, and can be measured in bytes. The internal processing parameter T is a time, can be of type real, and can be measured in seconds or fractions thereof. At operation 506, a next memory entry is retrieved. At operation 508, T is set equal to T plus t and M is set equal to M plus m. The method 500 includes setting tD to M/rD, tB=M/rB, and tP=M/rP at operation 510. The method 500 continues until a cumulated time (T+tD+tB+tP) is smaller than the latency time window or tL, such as is determined at operation 512. At the start of each loop (i.e. at operation 506) the next entry from the memory list is read. Each entry on the memory list has a start time and stop time, and each entry has a start position and end position. The calculation parameter t is the difference between the start time and stop time. The calculation parameter m is the difference between the start position and end position. The internal processing parameter T has the calculation parameter t added to it and the internal processing parameter M has the calculation parameter m added to it at operation 508. T and M are not reset to zero, but are accumulated at this point, at operation 506 and loops back thereto.

The cumulated time parameters for downlink tD, backhaul tB, and processing tP, can be calculated. The cumulated time parameter for downlink, tD, is the quotient of the accumulated position internal processing parameter, M, and the downlink rate parameter rD. The cumulated time parameter for backhaul, tB, is the quotient of the accumulated position internal processing parameter, M, and the backhaul rate parameter rB. Each of which may be determined at operation 510.

In response to determining tL>T+tD+tB+tP the internal processing parameter T is reset by deducting the latest calculation parameter t and the internal processing parameter M is reset by deducting the latest calculation parameter m, such as can be performed at operation 514.

A loop including operations 516, 518, 520, 522, and 524, continues until the cumulated time (T+tD+tB+tP) is smaller than the latency time window tL. At the start of each loop the next entry from the DAS is read at operation 516. The entry from the DAS is processed starting at the internal processing parameter time T. Each entry on the DAS has a start time and stop time and an activity identifier. The difference between the start and stop time is the calculation parameter, t, as previously discussed.

Using the activity identifier from the DAS entry, the write rate, r (a database parameter) is determined at operation 518. The database parameter lookup can leverage support for the memory model from the memory model circuitry 1108. At operation 520, the internal processing parameter T has the calculation parameter t added to it, the internal processing parameter M has the product of the calculation parameter t and the rate r added to it. T and M are not reset to zero, but are accumulated at this point. The internal processing parameter rCrit is set to the value of the rate r. The cumulated time parameters for downlink tD, backhaul tB, and processing tP, are calculated at operation 522. The cumulated time parameter for downlink, tD, is the quotient of the accumulated position internal processing parameter, M, and the downlink rate parameter rD. The cumulated time parameter for backhaul, tB, is the quotient of the accumulated position internal processing parameter, M, and the backhaul rate parameter rB.

At operation 526 (in response to determining tL>T+tD+tB+tP at operation 524), the processing parameter A is set to the sum of the reciprocals of the downlink rate, rD, the backhaul rate, rB, and the processing rate, rP. Next, at operation 528, the processing parameter dM is set according to: dM=(tL−T−AM)/(1/rCrit+A). Finally, the latency window is defined by the memory locations Lstart and Lend at operation 530. Lstart is zero and Lend is the sum of the processing parameters M and dM. The latency window is returned at operation 532. The result should be non-NULL unless the last period of the latency parameter tL has no data collected.

Because of the reciprocals present in the Latency calculations, exception handling can help assure that certain parameters and variables are non-zero. The latency calculation (performed by the latency calculator) can have database parameters associated with the rates at each of the downlink locations. Care may be taken to update these parameters as new capabilities are available or are altered at various locations. A decrease in downlink or backhaul rate can increase the amount of time taken for the tasks and will affect the latency. The Latency calculator circuitry 1110 can assume that there are memory results and a DAS for the period of the latency.

Perishable Calculator Circuitry

The perishable calculator circuitry 1112 determines the state of the data on the memory and determines if it is in danger of rolling off or being overwritten on the memory, such as before it is downloaded. The perishable calculator circuitry 1112 performs a look-ahead type of process, checking a future schedule from the time of interest to determine the amount of new data that is added to the memory and consequently pushing data off of the memory. Data that is within a threshold distance of the end of the memory can be considered perishable.

The perishable calculator circuitry 1112 takes as inputs one or more of DAS, CCS, PPS, time of interest, and the memory list and produces as output, the perishable list. The inputs are previously discussed. The perishable list can include a list of start and stop positions on the memory and the class of the perishable data. The positions can be of type integer and may have dimensions of bytes. Each list element can include a range of data on the memory where the data in the region could be lost if not downlinked. The perishable class is a designation that the data could be lost if certain conditions are/not met.

The perishable calculator circuitry 1112 takes the future collections from the DAS and CCS and maps the future collections to data on the current memory that will be lost if not downlinked. The processing for determining if data is perishable can be rather complex, at least in part because it is looking at the future state of collections and projecting it to the current state. The memory list supplies the current state of the memory. The DAS and CCS give information regarding the future schedule.

Figure 8:
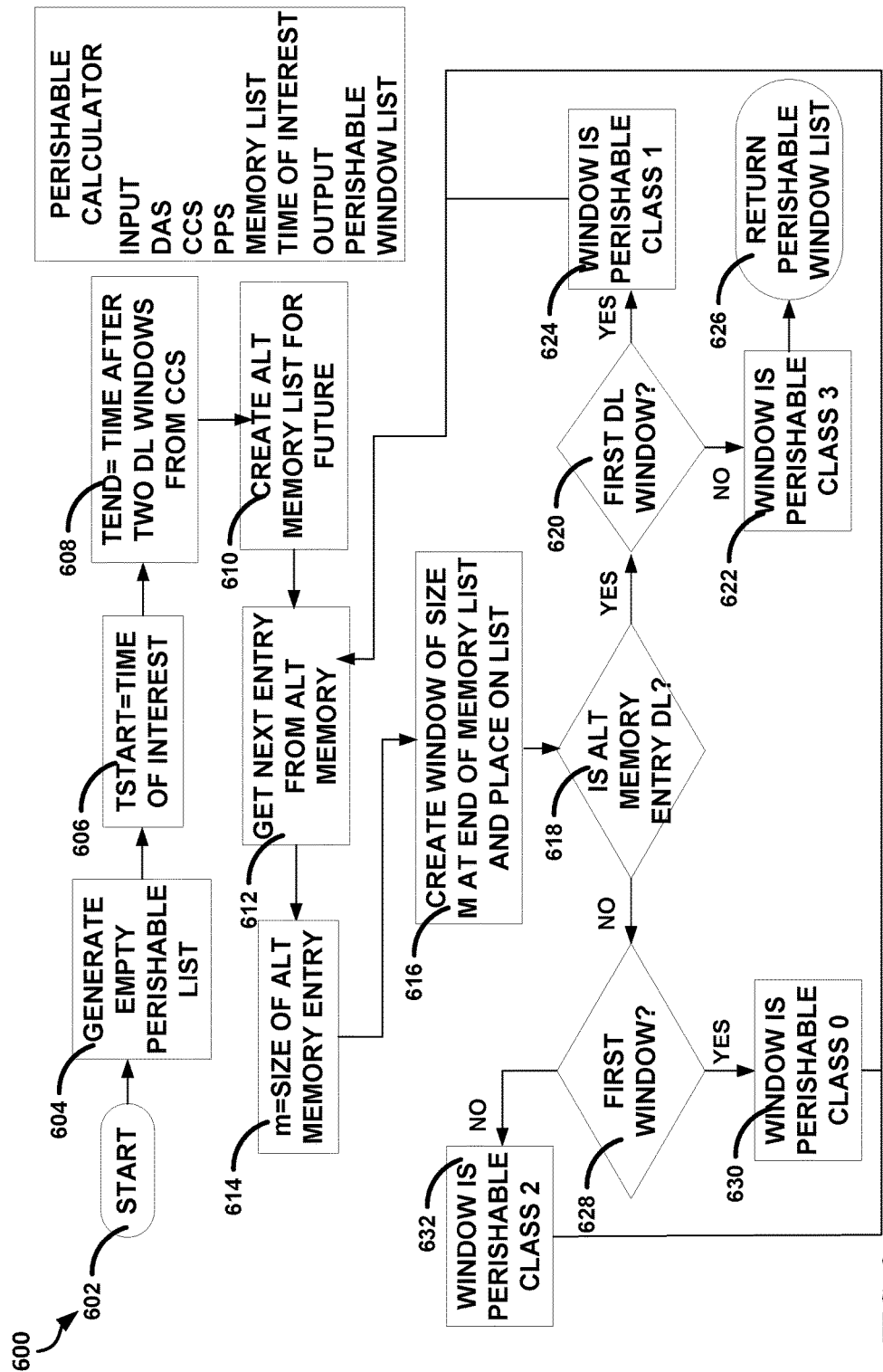
FIG. 8 illustrates, by way of example, a flow diagram of an embodiment of operations that can be performed by perishable calculator circuitry.

FIG. 8 illustrates, by way of example, a flow diagram of a method 600 for performing operations of the perishable calculator circuitry 1112. The method 600 begins at operation 602. Operation 604 includes generating an empty perishable list for the perishable windows. Each item on the list can include three parameters: the start time, the stop time, and the perishable class. Next, the method 600 can include (generating an internal processing parameter, Tstart, and) setting Tstart to the time of interest input value, at operation 606. The internal processing parameter, Tstart, is used as the start time for the memory model circuitry 1108. At operation 608, to determine Tend, the CCS is consulted. Moving forward in time from the time of interest, Tend is set to the end time of the second downlink window found. This helps ensure that the time range covers the likely perishable classes that will be encountered at this moment in the schedule.

At operation 610, the memory model circuitry 1108 can perform operations, such as by using the DAS, CCS, PPS, the Tstart, and the Tend. The memory model circuitry 1108 is discussed elsewhere herein. The output of the memory model circuitry 1108 is an alternate memory (Alt memory) for the future time including the next two downlink windows from the CCS.

Next, at operation 612, a next entry of the Alt memory is retrieved to create the perishable windows. There may be up to about three or four Alt memory entries, corresponding to the 3 or 4 perishable classes that are generated. At operation 614, the internal processing parameter m is set to the difference between the start and end time of the Alt memory entry. At operation 616, a map to memory end can be performed by the perishable calculator circuitry 1112 (see FIG. 9). The internal processing parameter in can be passed as the size of the window, the perishable list can be passed as well. If the current Alt memory entry is not part of the DL then, as determined at operation 618, then it is determined if the current Alt memory entry is the first entry on the list at operation 628. If the Alt memory entry is the first entry on the list, then the perishable class is determined to be and set to class zero and the method 600 continues at operation 630. If the Alt memory is not the first entry on the list, the window is determined to be and set to class two, at operation 632. Again, the method 600 continues at operation 612.

If, at operation 618, it is determined that the memory entry is part of the DL then it is determined if the Alt memory entry is the first DL window in the list at operation 620. If the Alt memory entry is the first DL window on the list, then the perishable class is determined to be and is set to class one, at operation 624 and the method 600 continues at operation 612. If the Alt memory entry is not the first downlink window on the list, it is determined that and the perishable class is set to three at operation 622. Last window is guaranteed to be perishable class three. At operation 626 the output list is provided and processing of the perishable calculator circuitry 1112 ends.

The Map to memory End Function ensures that a window is created at the end of a memory that is of an appropriate size. The Map to memory End Function takes two inputs: the size of the Alt memory window m, and the perishable list. An additional database parameter, the size of the memory, M, may be used. The output of the function is the perishable list.

Figure 9:
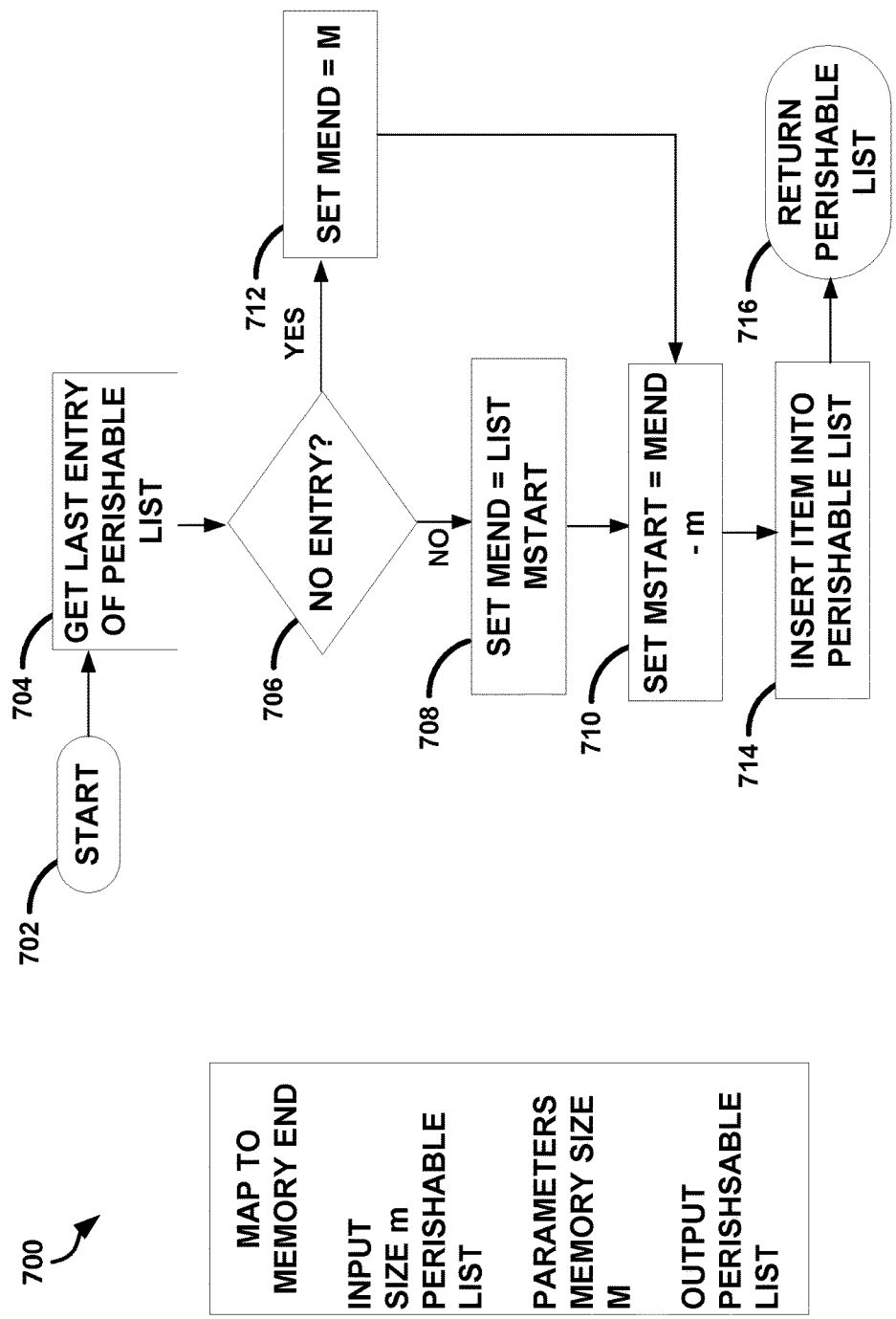
FIG. 9 illustrates, by way of example, a flow diagram of an embodiment of other operations that can be performed by perishable calculator circuitry.

FIG. 9 illustrates, by way of example, a flow diagram of an embodiment of a method 700 for performing operations of the map to memory end, such as can be performed by the perishable calculator circuitry 1112. The method 700 begins at operation 702. At operation 704, the method 700 continues by getting the last entry on the perishable list. At operation 706, it is determined whether there is an entry on the perishable list. If there is no entry in the list, then a new entry is created with Mend set to the memory size M, at operation 712. Otherwise, a new entry is created with Mend set to an mstart value of the existing entry at operation 708. Continuing at operation 710, the parameter Mstart on the new entry is set to the difference between Mend and the input size m. At operation 714 the new entry is inserted on the perishable list. The perishable list is returned at operation 716.

The database parameter, size of the memory, M, can be used to help ensure that the perishable values accurately measure the end of the memory. Should the size of the memory change, an update to the database can be performed, such as to help keep the function operating properly.

SD2D Calculator Circuitry

The SD2D calculator circuitry 1114 determines the data windows that have been scheduled for downlink, downlinked, scheduled for second downlink, and second downlinked based upon the PPS and the memory. The SD2D calculator circuitry 1114 can include logic to handle all four possibilities. Note that the term "scheduled" in this context refers to data that has been scheduled for downlink. And note that the term downlinked to refer to data that has been (or will be) downlinked, such as by the time of interest. The SD2D calculator circuitry 1114 takes the PPS, time of interest, and memory list as inputs and produces one or more lists as outputs, such as can include a scheduled list, downlinked list, second scheduled list, and/or second downlinked list.

The scheduled list can include a list of start and stop positions on the memory. The positions can be of type integer and/or have dimensions of bytes. Each list element consists of a range of data on the memory where the data in the region has been scheduled for DL by the time of interest.

The downlinked list can include a list of start and stop positions on the memory. The positions can be of type integer and/or can have dimensions of bytes. Each list element can include a range of data on the memory where the data in the region has been downlinked by the time of interest.

The second scheduled list can include a list of start and stop positions on the memory. The positions can be of type integer and/or have dimensions of bytes. Each list element consists of a range of data on the memory where the data in the region has been scheduled for a second downlink by the time of interest.

The second downlinked list can include a list of start and stop positions on the memory. The positions can be of type integer and/or have dimensions of bytes. Each list element can include a range of data on the memory where the data in the region has been downlinked a second time by the time of interest.

The SD2D calculator circuitry 1114 uses the information in the memory model and the PPS to determine the downlink state of one or more entries in the memory. The SD2D calculator circuitry 1114 uses the memory to determine the time of downlink, then searches the PPS for all downlink events. The SD2D calculator then categorizes each of the DL events from the PPS to determine on which output list the event(s) should be placed.

Figure 10:
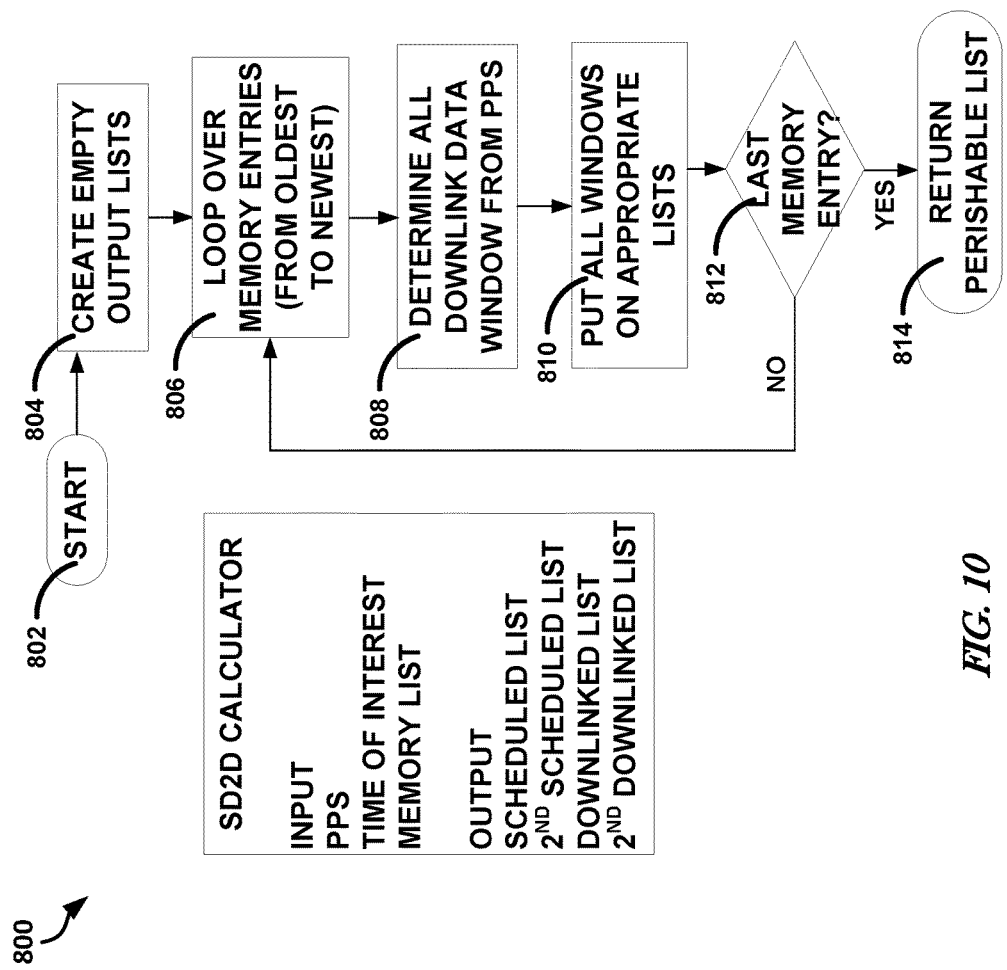
FIG. 10 illustrates, by way of example, a flow diagram of an embodiment of operations that can be performed by SD2D calculator circuitry.

FIG. 10 illustrates, by way of example, a flow diagram of an embodiment of a method 800 of operations that can be performed by the SD2D calculator circuitry 1114. The method 800 begins at operation 802, such as by reading the data from the input. The inputs are the PPS, the memory list, and the time of interest.

At operation 804 the method 800 continues by creating empty output lists. In one or more embodiments, there are four output lists. They are the scheduled list, the downlinked list, the second scheduled list, and the second downlinked list. Items on the lists can in the format of start time and stop time, corresponding to the regions where the data has been scheduled, downlinked, second scheduled, or second downlinked, respectively. At operation 806, the entries in the memory list can be looped over, such as starting from the end (the oldest). Each entry provides the start position and stop position of the data in question. The looping continues until the loop reaches another end of the memory list. The loop begins at operation 808 by using the memory position of the data to search the PPS for downlinks that cover the window of data, such as by using the PPS to memory linking function (described below). The loop continues at operation 810 by sending the list of PPS entries for the downlinks to the downlink logic function (discussed below). At operation 812 it is determined if the last entry processed is the last entry in the memory list. Output(s) are returned at operation 814.

Memory Linking Function

In one or more embodiments, and under normal operations for a system with polar orbiting satellites and two or more ground stations, there will generally be two or more downlinks of each data. The PPS is searched from the time of collection start, to approximately three or four orbits or the end of the PPS. The criteria for completing the search is to either have searched all of the PPS from time of collection to the end, from time of collection to three or four orbits, or until all of the data has been accounted for in two downlinks. This process generates a list of PPS entries for the downlinks.

Downlink Logic Function

The downlink logic function determines the state of the downlink data that is on the PPS entry list. The process first determines if the data is part of the scheduled or downlink period. It then sorts it into the first or second occurrence. Once the entry is sorted, it is placed on the appropriate list.

Figure 11:
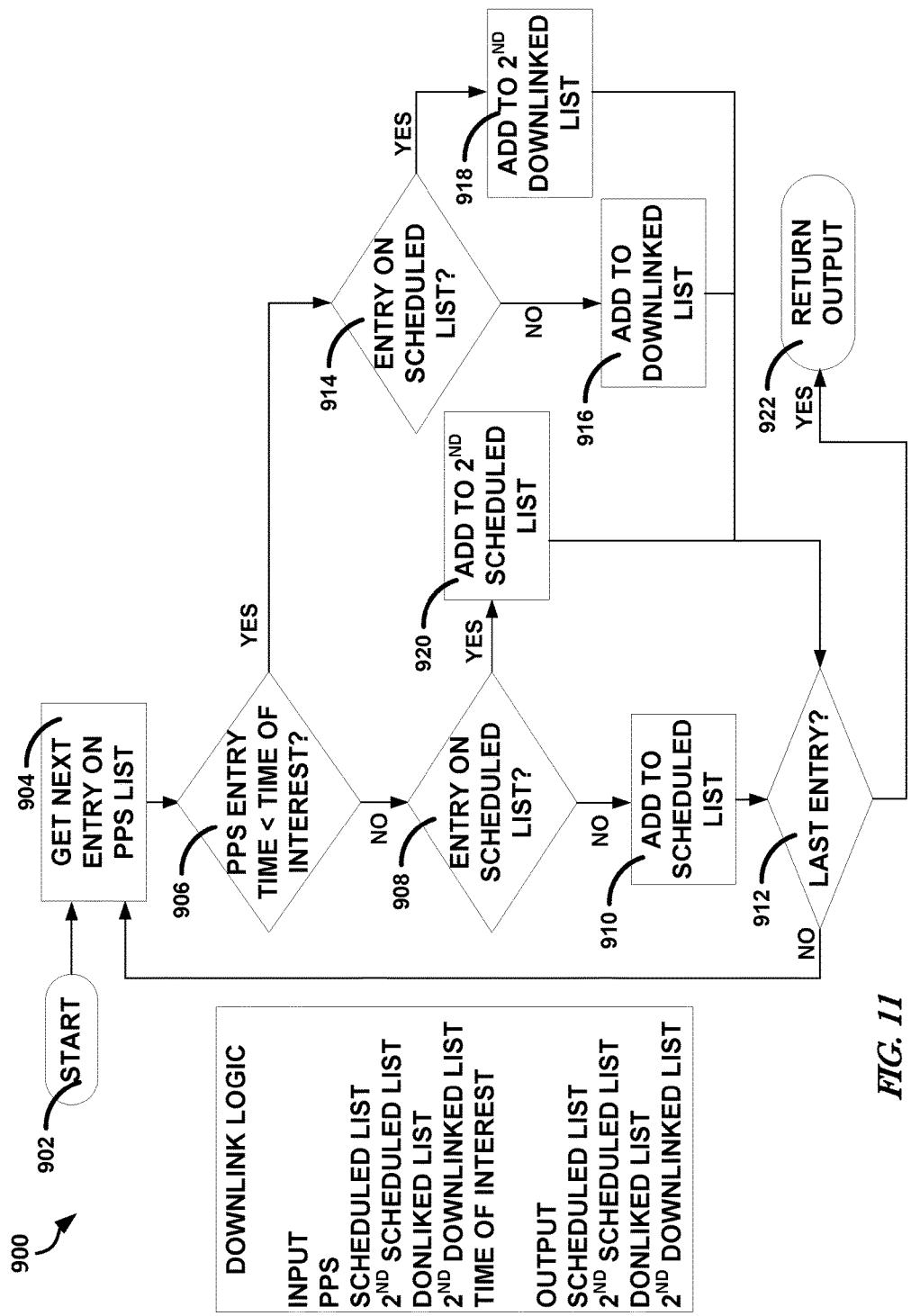
FIG. 11 illustrates, by way of example, a flow diagram of an embodiment of other operations that can be performed by SD2D calculator circuitry.

FIG. 11 illustrates, by way of example, a flow diagram of an embodiment of a method 900 for implementing operations of the downlink logic function, such as can be performed by the SD2D calculator circuitry 1114. The inputs to the downlink logic function can include the PPS entry list, the scheduled list, the second scheduled list, the downlinked list, the second downlinked list, and/or the time of interest. The output of the downlink logic function can include the scheduled list, the second scheduled list, the downlinked list, and the second downlinked list. The method 900 begins at operation 902. For each entry on the PPS list, the process loops beginning with retrieving the next entry on the PPS list at operation 904. At operation 906, it is determined if the PPS entry time is less than the time of interest. If the PPS entry time is less than the time of interest, then the entry has already happened and it is determined if there is an entry already on the downlinked list covering the window on the memory at operation 914. If the entry is on the downlinked list, then the entry is added to the second downlinked list at operation 918. Processing proceeds with the next entry on the PPS entry list at operation 904 if it is determined that the last entry processed is not the last entry to be processed, at operation 912. If, at operation 914, it is determined that the entry does not exist on the downlinked list, then the entry is added to the downlinked list at operation 916. Processing proceeds with the next entry on the PPS entry list at operation 904 if it is determined that the last entry processed is not the last entry to be processed at operation 912. If it is determined at operation 906 that the PPS entry is greater than the time of interest then it is determined, at operation 908, if there is an existing entry on the scheduled list. If there is already an entry on the scheduled list covering the window on the memory, as determined at operation 908, then the entry is added to the second scheduled list at operation 920. Processing proceeds with the next entry on the PPS entry list at operation 904, if it is determined that the last entry processed is not the last entry to be processed at operation 912. If it is determined at operation 908 that there is no existing entry on the scheduled list, then the entry is added to the scheduled list at operation 910. Processing proceeds with the next entry on the PPS entry list at operation 904, if it is determined that the last entry processed is not the last entry to be processed at operation 912. The method 900 terminates at operation 922 with returning the output lists, such as in response to determining the last entry has been processed at operation 912.

Backlog Calculator Circuitry

After all of the other states of the memory have been determined, the last piece of information is the backlog state of data. The intention of the backlog list is to complete the information necessary to validate the scheduling, such as with respect to SMD management.

The backlog calculator circuitry 1116 takes as input the scheduled list (from the SD2D calculator circuitry 1114), the downlinked list (from the SD2D calculator circuitry 1114), the latency list (from the latency calculator circuitry 1110), and/or the perishable list (from the perishable calculator circuitry 1112) and produces as an output a backlog list. The backlog list can include start and start positions on the memory. The positions can be of type integer and/or have units of bytes. Each element on the list can include a range of positions on the memory where the data is considered to be in a backlog state.

The backlog calculator circuitry 1116 operations include operations that determine the memory locations that are considered to be in a backlog state. Each of the input lists consists of regions where the results are true. To generate the backlog list, the false regions can be identified. Once the false regions have been identified, the resulting backlog regions having a true state include the intersection of false regions.

Figure 12:
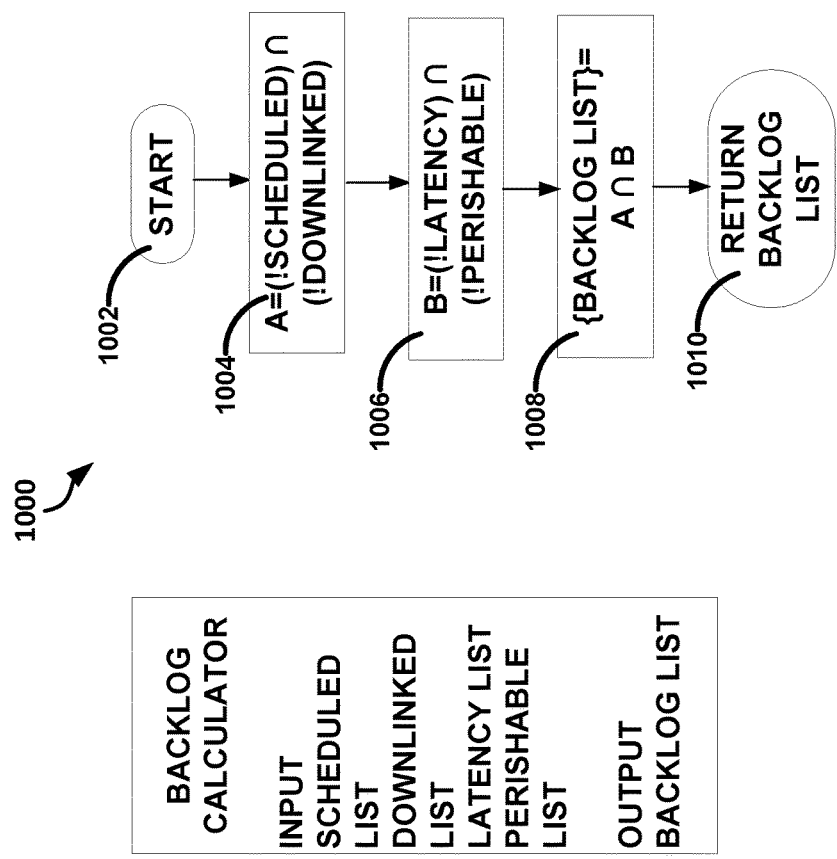
FIG. 12 illustrates, by way of example, a flow diagram of an embodiment of operations that can be performed by backlog calculator circuitry.

FIG. 12 illustrates, by way of example, a flow diagram of an embodiment of a method 1000 for implementing operations of the backlog calculator circuitry 1116. The method 1000 begins at operation 1002, such as by reading the inputs. If any of the inputs is a NULL result, the backlog calculator circuitry 1116 may generate a warning. The calculation can continue by treating the NULL result as all false. Another variation is to have the calculation return NULL if there is a NULL input.

At operation 1004, the intersection of the inverse of the scheduled list and the inverse of the downlinked list inputs is determined. In this operation it is to be determined if an entry is unscheduled and non-downlinked on the memory. If such positions are present on the memory, result A will be a list of intervals having true results for the calculation. At operation 1006, the intersection of the inverse of the latency list and the inverse of the perishable list inputs is determined. In this operation it is to be determined if data that has missed latency but has not yet reached a perishable state on the memory. If such positions are present on the memory, result B will be a list of intervals having true results for the calculation. At operation 1008 the backlog list is created, such as by taking the intersection between result A and result B. If such positions are present on the memory, the backlog list will have the intervals where the resulting intersection is true. The resulting list is the output of the backlog calculator circuitry 1116 and is returned at operation 1010.

Some logic within the SMD manager could be added or modified to meet other mission demands other than the expectations of the JPSS mission. Additional or alternative circuitry can be built computing more information. Furthermore, more schedule logic circuitry 1118 can be generated to produce other warnings.

The schedule logic circuitry 1118 uses feedback from the satellite (telemetry data) to determine if the downlinked and second downlinked operations have occurred. A purpose can be to give real-time feedback to the operator should a downlink not occur. In one or more embodiments, the time of interest for processing can be consistent with SO/T&C feedback for downlink windows. If the feedback occurs much faster than downlink operations, then the time of interest for processing to occur can be paced to the downlink windows. The downlinked list can be replaced by a real time downlinked list using feedback from the SO/T&C. A real time visual display of warnings zones for the data can be provided, such as through a display communicatively coupled to the schedule circuitry 1104. Such a display can give the operator an indication of off nominal operations.

It can be useful to provide recommended actions to the operator to deal with the warnings. Rather than giving a canned response, the schedule logic circuitry 1118 could find the scheduling action that could systematically get rid of the warnings and relay that action to the operator. The schedule logic circuitry 1118 can complete the revision to the schedule. This would in effect be an automated correction to the schedule, such as to help ensure that conditions of the schedule logic circuitry 1118 can be met. In one or more embodiments, the schedule logic circuitry 1118 can handle automatic scheduling of the downlinks. The schedule logic circuitry 1118 can manage the downlink.

Modules, Components, Logic, or Other Circuitry

Certain embodiments are described herein as including logic or a number of components, modules, circuitry, or other mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, (e.g., in a machine-readable medium for execution by, or to control the operation of, data processing apparatus, (e.g., a programmable processor, a computer, or multiple computers))).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, (e.g., a field programmable gate array (FPGA) or an application-specific integrated circuit (ASIC)). Circuitry can include one or more transistors, resistors, capacitors, inductors, diodes, regulators (voltage or current), oscillators, logic gates, or other electric or electronic components arranged as a state machine, circuit, or other processing unit, configured to perform operations of one or more of the methods 100, 200, 300, 400, 500, 600, 700, 800, 900, and 1000.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 13:
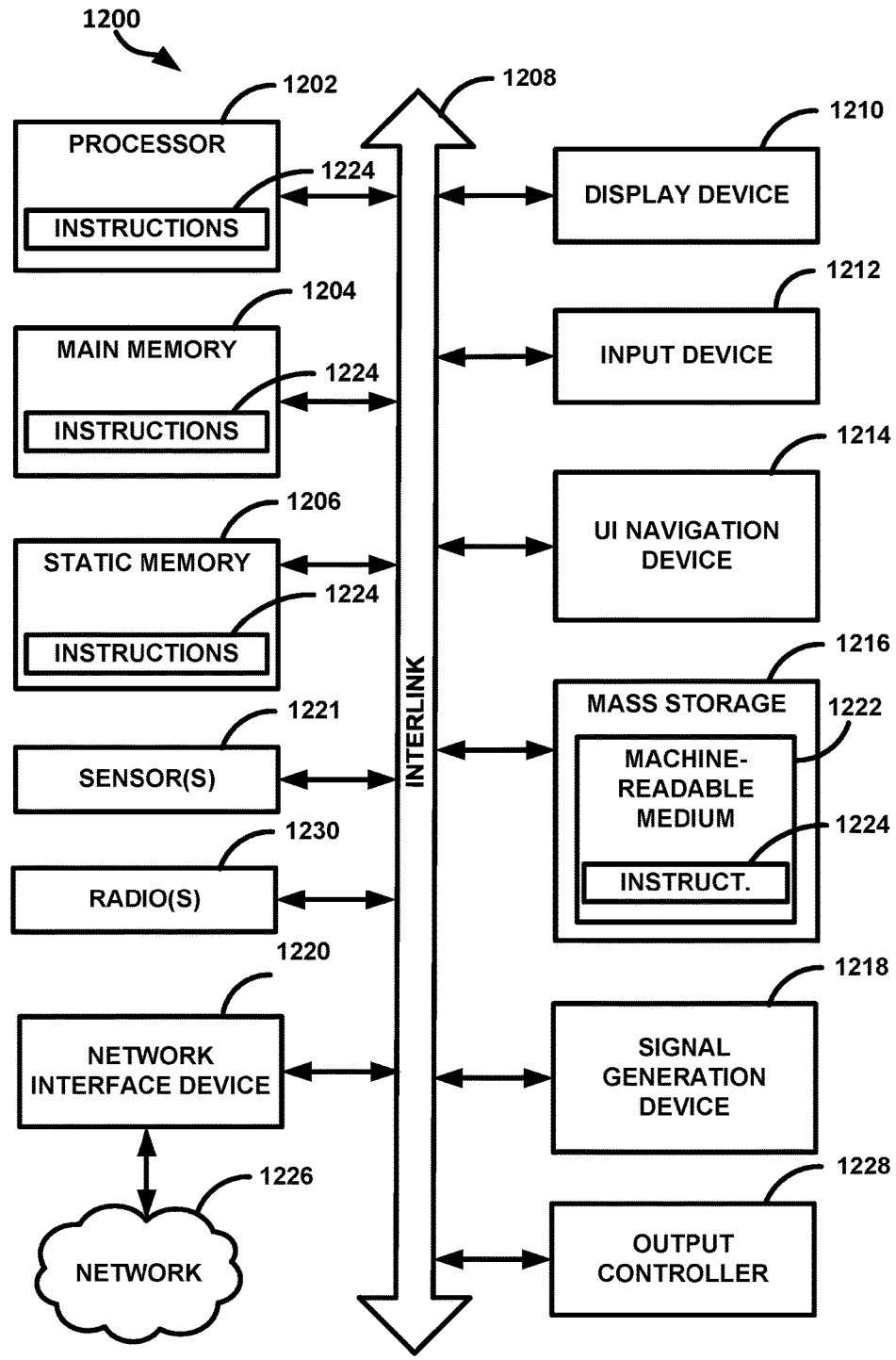
FIG. 13 illustrates, by way of example, a logical block diagram of an embodiment of a system.

FIG. 13 illustrates, by way of example, a block diagram of an embodiment of a machine in the example form of a computer system 1200 within which instructions, for causing the machine to perform any one or more of the methods discussed herein, may be executed. One or more of the memory model circuitry 1108, the latency calculator circuitry 1110, the perishable calculator circuitry 1112, the SD2D calculator circuitry 1114, the backlog calculator circuitry 1116, and the schedule logic circuitry 1118 can include one or more of the items with reference numbers of the computer system 1200. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker), a network interface device 1220, and radios 1230 such as Bluetooth, WWAN, WLAN, and NFC, permitting the application of security controls on such protocols.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only memory (EPROM), Electrically Erasable Programmable Read-Only memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLES AND ADDITIONAL NOTES

Example 1 can include or use subject matter (such as an apparatus, a method, a means for performing operations, or a machine readable memory including instructions that, when performed by the machine, can configure the machine to perform acts), such as can include or use receiving, at scheduler circuitry, a plurality of schedules including a first schedule that is a first subset of the master schedule detailing activities to be carried out, a second schedule that is a second subset of the master schedule detailing downlink time windows in which data can be transferred from a node to another memory, and a list indicating mapping of data on the limited memory, determining, at the scheduler circuitry and based on the first schedule and the list, whether there is a threshold latency between mission data collection and downlink, determining, at the scheduler circuitry and based on the first schedule, the second schedule, and the list, whether any mission data will be overwritten in performing operations of the master schedule, and providing, by a display communicatively coupled to the scheduler circuitry, a first warning in response to determining that there is a threshold latency between mission data collection and downlink and a second warning in response to determining that mission data will be overwritten.

Example 2 can include or use, or can optionally be combined with the subject matter of Example 1 to include or use receiving, at the scheduler circuitry, a third schedule that is a third subset of the master schedule and providing the list based on the first schedule, second schedule, and third schedule, the list including a start time and a stop time of a task associated with mission data on the memory, a start position and a stop position of the mission data, and a rate of data write to the memory.

Example 3 can include or use, or can optionally be combined with the subject matter of at least one of Examples 1-2 to include or use, wherein providing the list includes using the third schedule to create a plurality of windows indicating start and stop times of downlinking data, using the second schedule to refine the downlink times, and determining data amounts collected by the node in each window of the plurality of windows based on the first schedule.

Example 4 can include or use, or can optionally be combined with the subject a matter of at least one of Examples 1-3 to include or use, wherein determining whether there is a threshold latency includes using a backhaul rate that indicates a rate of backhaul from a ground terminal, a downlink rate of data between the node and the ground terminal, a data production rate that indicates a rate at which data is produced by the node, and the latency threshold that indicates a maximum tolerable latency that still meets latency requirements.

Example 5 can include or use, or can optionally be combined with the subject matter of at least one of Examples 1-4 to include or use, wherein determining whether any mission data will be overwritten in performing operations of the master schedule includes using one or more of the first schedule, the second schedule, the third schedule, and the list to determine whether data one the memory will be downloaded a second time before it is overwritten and generating the second warning in response to determining the data will not be downloaded the second time.

Example 6 can include or use, or can optionally be combined with the subject matter of Example 5 to include or use determining data on the memory is in a backlog state and generating a third warning indicating that the data is in the backlog state in response to determining the data is in the backlog state.

Example 7 can include or use, or can optionally be combined with the subject matter of Example 6 to include or use, wherein determining the data on the memory is in the backlog state includes determining the data is not scheduled to be downlinked, not downlinked, there is a threshold latency between collection of the data on the memory and downlink, and the data will not be overwritten in performing operations of the master schedule.

Example 8 can include or use, or can optionally be combined with the subject matter of Example 7 to include or use, wherein determining the data on the memory is in the backlog state is based on the first schedule, second schedule, and third schedule.

Example 9 can include or use subject matter (such as an apparatus, a method, a means for performing operations, or a machine readable memory including instructions that, when performed by the machine, can configure the machine to perform acts), such as can include or use latency calculator circuitry configured to determine, based on a first schedule and a list, whether there is a threshold latency between mission data collection and downlink of the mission data, the first schedule is a first subset of the master schedule and details activities to be carried out by the node, and the list indicating mapping of the mission data on the limited memory, perishable calculator circuitry configured to determine, based on the first schedule, the second schedule, and the list, whether any mission data will be overwritten in performing operations of the master schedule, and providing, by a display communicatively coupled to the perishable calculator circuitry and the latency calculator circuitry, a first warning in response to determining that there is a threshold latency between mission data collection and downlink and a second warning in response to determining that mission data will be overwritten.

Example 10 can include or use, or can optionally be combined with the subject matter of Example 9 to include or use memory model circuitry coupled to the latency calculator circuitry and the perishable calculator circuitry, the memory model circuitry configured to determine, based on the first schedule, the second schedule, a third schedule, and provide the list, the list including a start time and a stop time of a task associated with mission data on the memory, a start position and a stop position of the mission data, and a rate of data write to the memory, the third schedule is another subset of the master schedule.

Example 11 can include or use, or can optionally be combined with the subject matter of Example 10 to include or use, wherein the memory model circuitry providing the list includes using the third schedule to create a plurality of windows indicating start and stop times of downlinking the mission data, using the second schedule to refine the start and stop times, and determining data amounts collected by the node in each window of the plurality of windows based on the first schedule.

Example 12 can include or use, or can optionally be combined with the subject matter of at least one of Examples 9-11 to include or use, wherein the latency calculator circuitry determining whether there is a threshold latency includes using a backhaul rate that indicates a rate of backhaul from a ground terminal, a downlink rate of data between the node and the ground terminal, and a data production rate that indicates a rate at which data is produced by the node, and wherein the latency threshold that indicates a maximum tolerable latency that still meets latency requirements of the master schedule.

Example 13 can include or use, or can optionally be combined with the subject matter of Example 12 to include or use, wherein the perishable calculator circuitry determining whether any mission data will be overwritten in performing operations of the master schedule includes using one or more of the first schedule, the second schedule, the third schedule, and the list to determine whether mission data on the memory will be downloaded a second time before it is overwritten and generating the second warning in response to determining the data will not be downloaded the second time.

Example 14 can include or use, or can optionally be combined with the subject matter of Example 13 to include or use, backlog calculator circuitry coupled to the display, wherein the backlog calculator circuitry is configured to determine mission data on the memory is in a backlog state and provide at least one signal that causes the display to generate a third warning indicating that the data is in the backlog state in response to determining the data is in the backlog state.

Example 15 can include or use, or can optionally be combined with the subject a matter of Example 14 to include or use, wherein the calculator circuitry determining the data on the memory is in the backlog state includes determining the data is not scheduled to be downlinked, not downlinked, there is a threshold latency between collection of the data on the memory and downlink, and the data will not be overwritten in performing operations of the master schedule.

Example 16 can include or use, or can optionally be combined with the subject matter of Example 15 to include or use, wherein the backlog calculator circuitry determining the data on the memory is in the backlog state is based on the first schedule, the second schedule, and the third schedule.

Example 17 can include or use subject matter (such as an apparatus, a method, a means for performing operations, or a machine readable memory including instructions that, when performed by the machine, can configure the machine to perform acts), such as can include or use receiving a plurality of schedules including a first schedule that is a first subset of the master schedule detailing activities to be carried out, a second schedule that is a second subset of the master schedule detailing downlink time windows in which data can be transferred from a node to another memory, and a list indicating mapping of data on the limited memory, determining, based on the first schedule and the list, whether there is a threshold latency between mission data collection and downlink, determining, based on the first schedule, the second schedule, and the list, whether any mission data will be overwritten in performing operations of the master schedule, and providing signals that cause a display to provide a first warning in response to determining that there is a threshold latency between mission data collection and downlink and a second warning in response to determining that mission data will be overwritten.

Example 18 can include or use, or can optionally be combined with the subject matter of Example 17 to include or use instructions that, when executed by the machine, configure the machine to receive a third schedule that is a third subset of the master schedule and provide the list based on the first schedule, second schedule, and third schedule, the list including a start time and a stop time of a task associated with mission data on the memory, a start position and a stop position of the mission data, and a rate of data write to the memory.

Example 19 can include or use, or can optionally be combined with the subject matter of Example 18, wherein the instructions for providing the list include instructions for using the third schedule to create a plurality of windows indicating start and stop times of downlinking data, using the second schedule to refine the downlink times, and determining data amounts collected by the node in each window of the plurality of windows based on the first schedule.

Example 20 can include or use, or can optionally be combined with the subject a matter of at least one of Examples 17-19, wherein the instructions for determining whether there is a threshold latency include instructions for using a backhaul rate that indicates a rate of backhaul from a ground terminal, a downlink rate of data between the node and the ground terminal, a data production rate that indicates a rate at which data is produced by the node, and the latency threshold that indicates a maximum tolerable latency that still meets latency requirements.

Example 21 can include or use, or can optionally be combined with the subject matter of Example 20, to include or use, wherein the instructions for determining whether any mission data will be overwritten in performing operations of the master schedule include instructions for using one or more of the first schedule, the second schedule, the third schedule, and the list to determine whether data one the memory will be downloaded a second time before it is overwritten and generating the second warning in response to determining the data will not be downloaded the second time.

Example 22 can include or use, or can optionally be combined with the subject matter of Example 21, to include or use instructions that, when executed by the machine, configure the machine to determine data on the memory is in a backlog state and generating a third warning indicating that the data is in the backlog state in response to determining the data is in the backlog state.

Example 23 can include or use, or can optionally be combined with the subject matter of Example 22, to include or use, wherein the instructions for determining the data on the memory is in the backlog state include instructions for determining the data is not scheduled to be downlinked, not downlinked, there is a threshold latency between collection of the data on the memory and downlink, and the data will not be overwritten in performing operations of the master schedule.

Example 24 can include or use, or can optionally be combined with the subject matter of Example 23, to include or use, wherein instructions for determining the data on the memory is in the backlog state include instructions for determining the data on the memory is in the backlog state based on the first schedule, the second schedule, and the third schedule.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method including operations for determining if a master schedule will allow information to be recorded and downloaded from a node that collects mission data and has a limited memory, the method comprising:

receiving, at scheduler circuitry, a plurality of schedules including a first schedule that is a first subset of the master schedule detailing activities to be carried out, a second schedule that is a second subset of the master schedule detailing downlink time windows in which data can be transferred from a node to another memory, and a list indicating mapping of data on the limited memory;

determining, at the scheduler circuitry and based on the first schedule and the list, whether there is a threshold latency between mission data collection and downlink;

determining, at the scheduler circuitry and based on the first schedule, the second schedule, and the list, whether any mission data will be overwritten in performing operations of the master schedule; and providing, by a display communicatively coupled to the scheduler circuitry, a first warning in response to determining that there is a threshold latency between mission data collection and downlink and a second warning in response to determining that mission data will be overwritten.

2. The method of claim 1, further comprising receiving, at the scheduler circuitry, a third schedule that is a third subset of the master schedule and providing the list based on the first schedule, second schedule, and third schedule, the list including a start time and a stop time of a task associated with mission data on the memory, a start position and a stop position of the mission data, and a rate of data write to the memory.

3. The method of claim 2, wherein providing the list includes using the third schedule to create a plurality of windows indicating start and stop times of downlinking data, using the second schedule to refine the downlink times, and determining data amounts collected by the node in each window of the plurality of windows based on the first schedule.

4. The method of claim 1, wherein determining whether there is a threshold latency includes using a backhaul rate that indicates a rate of backhaul from a ground terminal, a downlink rate of data between the node and the ground terminal, a data production rate that indicates a rate at which data is produced by the node, and the latency threshold that indicates a maximum tolerable latency that still meets latency requirements.

5. The method of claim 1, wherein determining whether any mission data will be overwritten in performing operations of the master schedule includes using one or more of the first schedule, the second schedule, the third schedule, and the list to determine whether data one the memory will be downloaded a second time before it is overwritten and generating the second warning in response to determining the data will not be downloaded the second time.

6. The method of claim 5, further comprising determining data on the memory is in a backlog state and generating a third warning indicating that the data is in the backlog state in response to determining the data is in the backlog state.

7. The method of claim 6, wherein determining the data on the memory is in the backlog state includes determining the data is not scheduled to be downlinked, not downlinked, there is a threshold latency between collection of the data on the memory and downlink, and the data will not be overwritten in performing operations of the master schedule.

8. The method of claim 7, wherein determining the data on the memory is in the backlog state is based on the first schedule, second schedule, and third schedule.

9. A system for determining if a master schedule will allow information to be recorded and downlinked from a node that collect mission data and has a limited memory, the system comprising:

latency calculator circuitry configured to determine, based on a first schedule and a list, whether there is a threshold latency between mission data collection and downlink of the mission data, the first schedule is a first subset of the master schedule and details activities to be carried out by the node, and the list indicating mapping of the mission data on the limited memory;

perishable calculator circuitry configured to determine, based on the first schedule, the second schedule, and the list, whether any mission data will be overwritten in performing operations of the master schedule; and providing, by a display communicatively coupled to the perishable calculator circuitry and the latency calculator circuitry, a first warning in response to determining that there is a threshold latency between mission data collection and downlink and a second warning in response to determining that mission data will be overwritten.

10. The system of claim 9, further comprising memory model circuitry coupled to the latency calculator circuitry and the perishable calculator circuitry, the memory model circuitry configured to determine, based on the first schedule, the second schedule, a third schedule, and provide the list, the list including a start time and a stop time of a task associated with mission data on the memory, a start position and a stop position of the mission data, and a rate of data write to the memory, the third schedule is another subset of the master schedule.

11. The system of claim 10, wherein the memory model circuitry providing the list includes using the third schedule to create a plurality of windows indicating start and stop times of downlinking the mission data, using the second schedule to refine the start and stop times, and determining data amounts collected by the node in each window of the plurality of windows based on the first schedule.

12. The system of claim 9, wherein the latency calculator circuitry determining whether there is a threshold latency includes using a backhaul rate that indicates a rate of backhaul from a ground terminal, a downlink rate of data between the node and the ground terminal, and a data production rate that indicates a rate at which data is produced by the node, and wherein the latency threshold that indicates a maximum tolerable latency that still meets latency requirements of the master schedule.

13. The system of claim 12, wherein the perishable calculator circuitry determining whether any mission data will be overwritten in performing operations of the master schedule includes using one or more of the first schedule, the second schedule, the third schedule, and the list to determine whether mission data on the memory will be downloaded a second time before it is overwritten and generating the second warning in response to determining the data will not be downloaded the second time.

14. The system of claim 13, further comprising backlog calculator circuitry coupled to the display, wherein the backlog calculator circuitry is configured to determine mission data on the memory is in a backlog state and provide at least one signal that causes the display to generate a third warning indicating that the data is in the backlog state in response to determining the data is in the backlog state.

15. The system of claim 14, wherein the calculator circuitry determining the data on the memory is in the backlog state includes determining the data is not scheduled to be downlinked, not downlinked, there is a threshold latency between collection of the data on the memory and downlink, and the data will not be overwritten in performing operations of the master schedule.

16. The system of claim 15, wherein the backlog calculator circuitry determining the data on the memory is in the backlog state is based on the first schedule, the second schedule, and the third schedule.

17. A non-transitory machine-readable medium including instructions stored thereon that, when executed by a machine, configure the machine to perform operations for determining if a master schedule will allow information to be recorded and downloaded from a node that collects mission data and has a limited memory, the operations comprising:
receiving a plurality of schedules including a first schedule that is a first subset of the master schedule detailing activities to be carried out, a second schedule that is a second subset of the master schedule detailing downlink time windows in which data can be transferred from a node to another memory, and a list indicating mapping of data on the limited memory;
determining, based on the first schedule and the list, whether there is a threshold latency between mission data collection and downlink;
determining, based on the first schedule, the second schedule, and the list, whether any mission data will be overwritten in performing operations of the master schedule; and
providing signals that cause a display to provide a first warning in response to determining that there is a threshold latency between mission data collection and downlink and a second warning in response to determining that mission data will be overwritten.

18. The non-transitory machine-readable medium of claim 17, further comprising instructions that, when executed by the machine, configure the machine to receive a third schedule that is a third subset of the master schedule and provide the list based on the first schedule, second schedule, and third schedule, the list including a start time and a stop time of a task associated with mission data on the memory, a start position and a stop position of the mission data, and a rate of data write to the memory.

19. The non-transitory machine-readable medium of claim 18, wherein the instructions for providing the list include instructions for using the third schedule to create a plurality of windows indicating start and stop times of downlinking data, using the second schedule to refine the downlink times, and determining data amounts collected by the node in each window of the plurality of windows based on the first schedule.

20. The non-transitory machine-readable medium of claim 17, wherein the instructions for determining whether there is a threshold latency include instructions for using a backhaul rate that indicates a rate of backhaul from a ground terminal, a downlink rate of data between the node and the ground terminal, a data production rate that indicates a rate at which data is produced by the node, and the latency threshold that indicates a maximum tolerable latency that still meets latency requirements.

* * * * *

UNITED STATES PATENT AND TRADEMARK OFFICE
CERTIFICATE OF CORRECTION

PATENT NO. : 10,069,713 B2  
APPLICATION NO. : 15/350030  
DATED : September 4, 2018  
INVENTOR(S) : Teter et al.

Page 1 of 1

It is certified that error appears in the above-identified patent and that said Letters Patent is hereby corrected as shown below:

In the Drawings

On sheet 11 of 13, Fig. 11, delete "DONLIKED" and insert --DOWNLINKED-- therefor On sheet 11 of 13, Fig. 11, delete "DONLIKED" and insert --DOWNLINKED-- therefor In the Specification In Column 3, Line 43, delete "3106" and insert --1306-- therefor In Column 7, Lines 6-7, after "warning", insert --.--

In Column 10, Line 51, delete "in" and insert --m-- therefor

In Column 13, Line 59, delete "in" and insert --m-- therefor

In Column 22, Line 23, after "subject", delete "a"

In Column 23, Line 67, after "subject", delete "a"

In Column 24, Line 53, after "subject", delete "a"

Signed and Sealed this  
Twenty-eighth Day of April, 2020

Andrei Iancu  
*Director of the United States Patent and Trademark Office*